United States Patent [19]

Kishi et al.

[11] Patent Number: 5,149,399

[45] Date of Patent: Sep. 22, 1992

[54] LIQUID EVAPORATOR

[75] Inventors: Mitsuhiro Kishi; Toyohiko Sunaoka, both of Tochigi, Japan

[73] Assignee: Kabushiki Kaisha Japanic/Japanic Corporation, Tochigi, Japan

[21] Appl. No.: 301,543

[22] Filed: Jan. 24, 1989

[30] Foreign Application Priority Data

| May 10, 1988 | [JP] | Japan | 63-113269 |
| May 21, 1988 | [JP] | Japan | 63-124149 |
| Jul. 12, 1988 | [JP] | Japan | 63-172851 |
| Nov. 19, 1988 | [JP] | Japan | 63-292788 |

[51] Int. Cl.[5] .......... B01D 1/00; C02F 1/04
[52] U.S. Cl. ............ 159/22; 4/111.1; 4/111.2; 4/111.6; 122/13.1; 126/362; 126/363; 126/380; 159/29; 159/44; 159/47.3; 202/160; 202/181; 202/206; 202/233; 202/237; 202/267.1; 392/322; 392/450; 392/451; 392/501
[58] Field of Search .......... 203/100, 1, 2, 86, DIG. 5; 202/160, 181, 267.1, 206, 233, 237, 269; 122/13.1; 4/111.2, 111.6, 111.1; 159/22, 29, 44, 47.3, DIG. 1; 392/322, 324, 450, 451, 501, 498; 126/362, 363, 380

[56] References Cited

U.S. PATENT DOCUMENTS

| 2,408,403 | 10/1946 | Balbson et al. | 392/442 |
| 2,605,381 | 7/1952 | Head | 159/DIG. 1 |
| 2,728,717 | 12/1955 | Madorsky | 159/DIG. 1 |
| 3,189,725 | 6/1965 | Anderson et al. | 392/322 |
| 3,275,798 | 9/1966 | Martin | 392/451 |
| 3,444,051 | 5/1969 | Popma et al. | 202/202 |
| 3,498,076 | 3/1970 | Michael | 62/291 |
| 3,506,543 | 4/1970 | Hayes et al. | 202/202 |
| 3,633,220 | 1/1972 | Lagstrom | 4/111.5 |
| 3,635,799 | 1/1972 | Lowi, Jr. | 203/10 |
| 3,649,970 | 3/1972 | Blankenship | 4/111.2 |
| 3,766,017 | 10/1973 | Moss | 202/197 |
| 3,890,653 | 6/1975 | Blankenship | 4/111.1 |
| 3,890,654 | 6/1975 | Blankenship | 4/111.1 |
| 3,921,227 | 11/1975 | Blankenship | 4/111.1 |
| 3,943,579 | 3/1976 | Blankenship | 4/111.1 |
| 4,044,696 | 8/1977 | Marincek | 203/DIG. 5 |
| 4,148,103 | 4/1979 | Nishioka | 4/111.1 |
| 4,159,547 | 7/1979 | Blankenship | 4/111.1 |
| 4,205,403 | 6/1980 | Blankenship | 4/111.1 |
| 4,313,234 | 2/1982 | Stewart | 4/449 |
| 4,425,671 | 1/1984 | Nelken | 4/111.3 |
| 4,495,873 | 1/1985 | Blankenship | 4/111.1 |
| 4,586,981 | 5/1986 | Golubev ete al. | 202/197 |
| 4,865,014 | 9/1989 | Nelson | 126/361 |

FOREIGN PATENT DOCUMENTS

| 0621356 | 8/1978 | U.S.S.R. | 159/DIG. 1 |
| 2089950 | 6/1982 | United Kingdom | 219/312 |

Primary Examiner—Virginia Manoharan
Attorney, Agent, or Firm—Flynn, Thiel, Boutell & Tanis

[57] ABSTRACT

A liquid evaporator includes an air-tight outer container containing liquid therein, the liquid container having support legs adjacent the bottom surface thereof; an inner container mounted on the legs for partitioning the interior space of the outer container, the inner container having a wall made of insulating material; and a heater fixed to an upper portion of the outer container and positioned inside the inner container. The liquid evaporator may be combined with a deodorizing device for forming a urine treating device, wherein the urine treating device includes a deodorizing housing having an upper portion provided with a secondary heater therein, a catalyst surrounding the secondary heater, a blower provided outside the housing, and a diffusion pipe provided at the upper portion of the housing.

23 Claims, 22 Drawing Sheets

PRIOR-ART

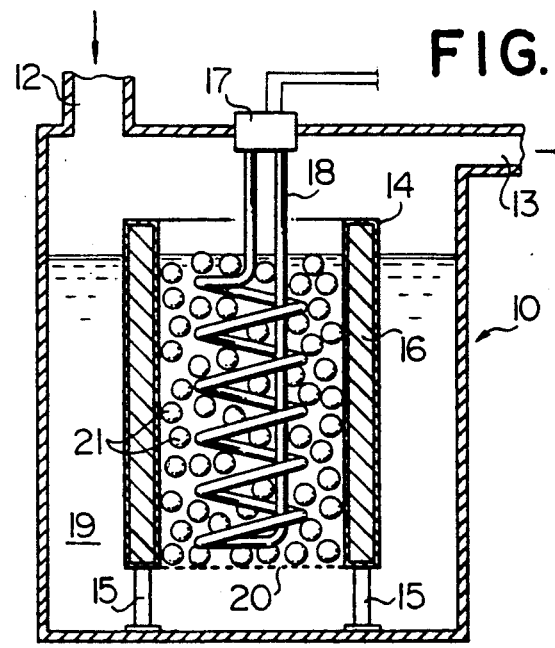
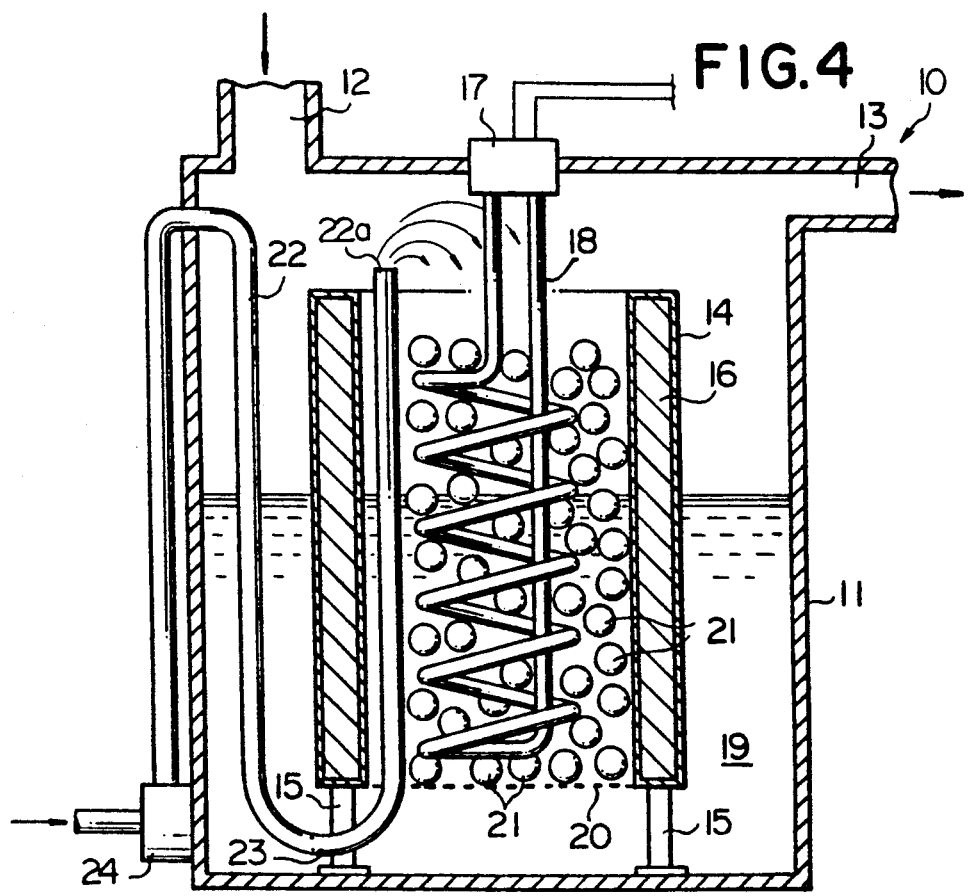

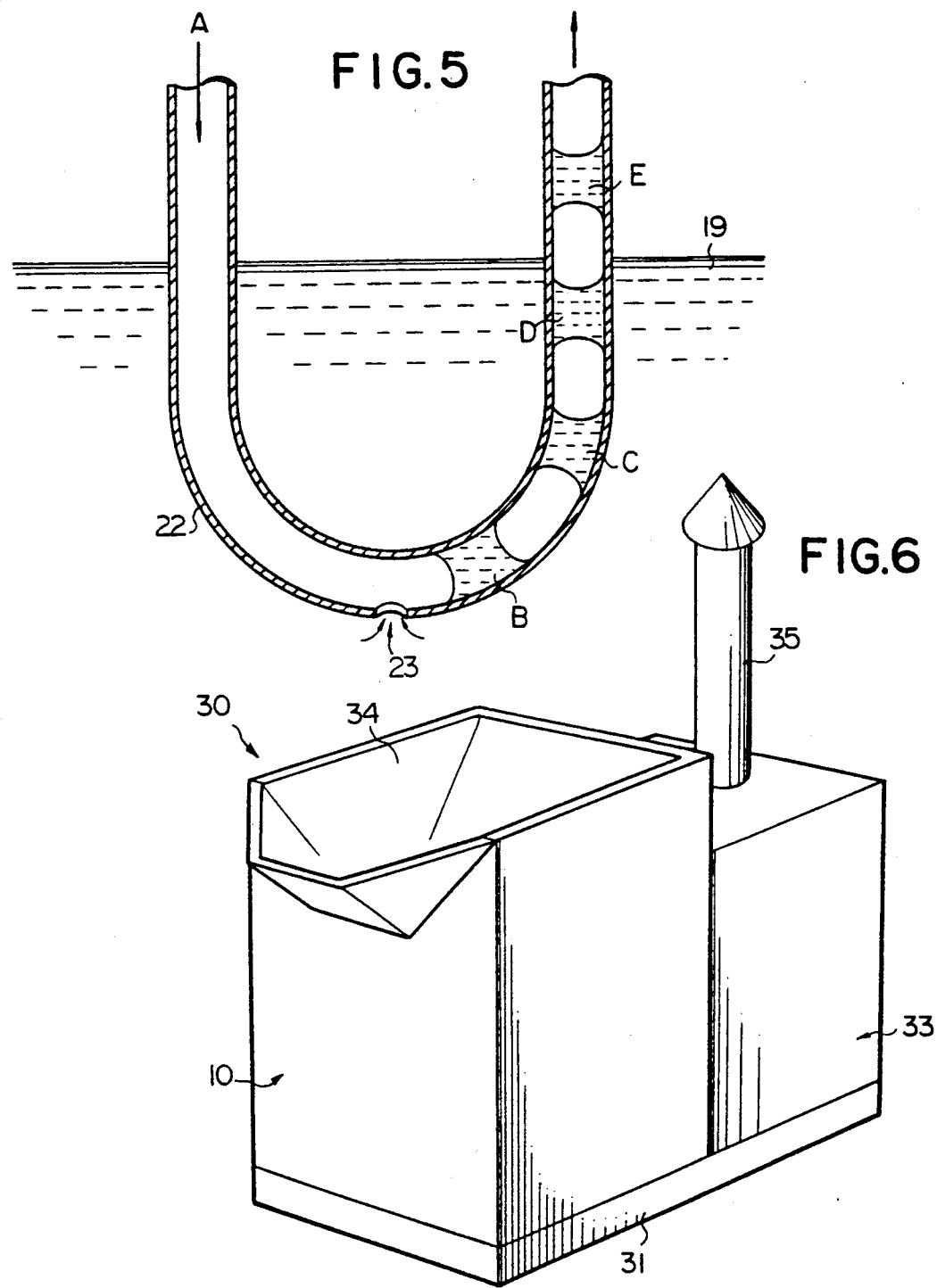

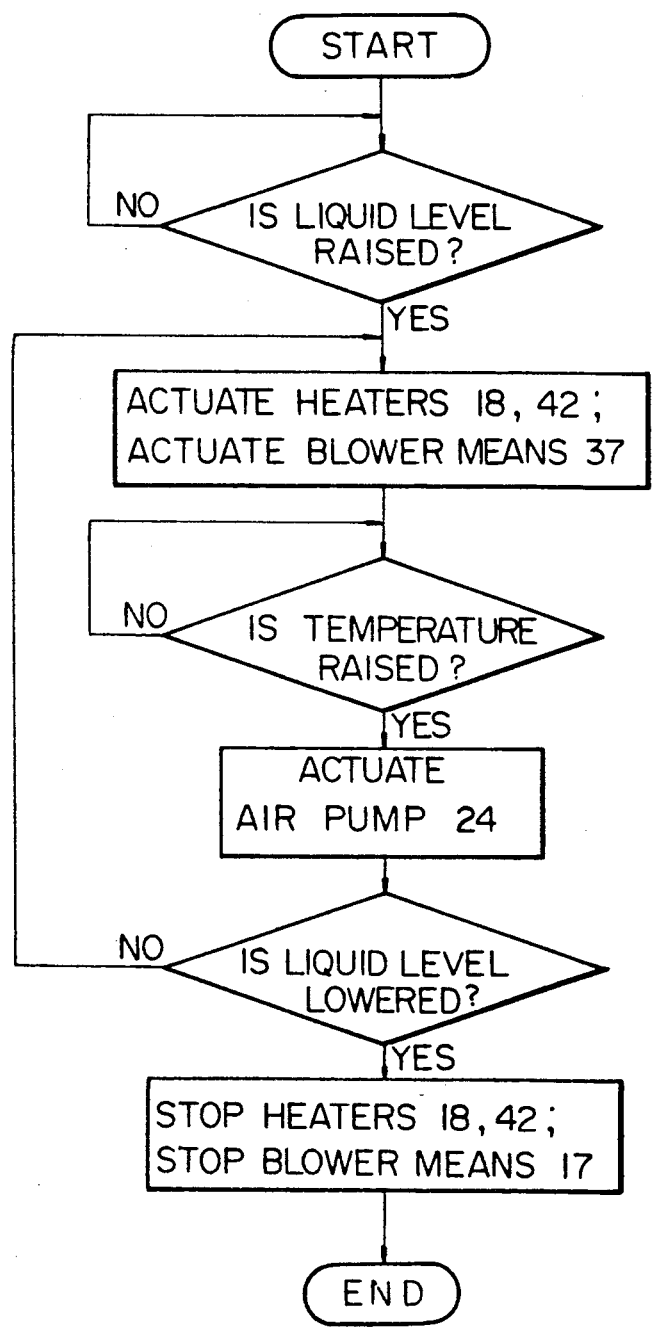

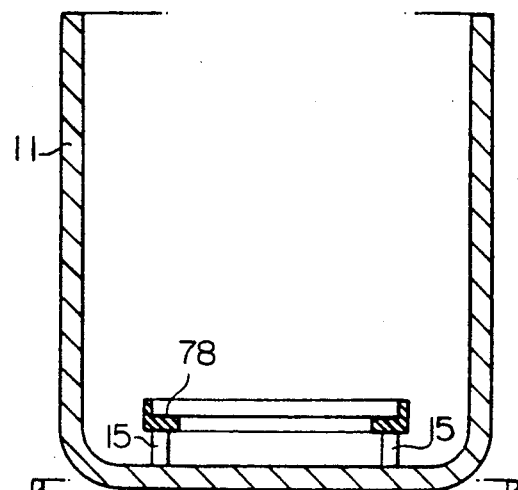
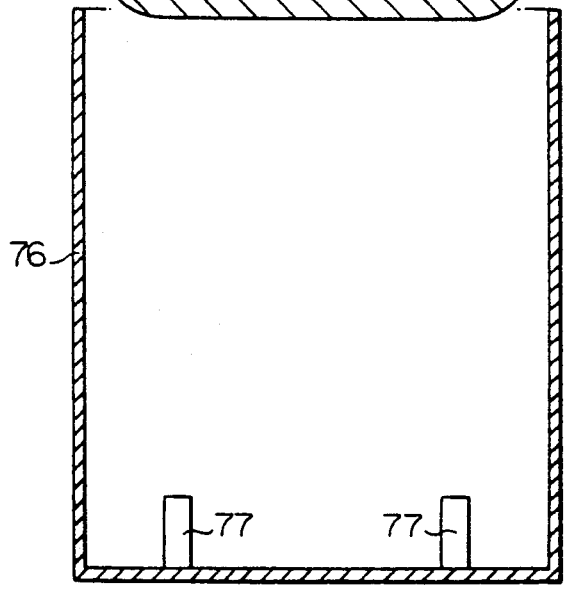
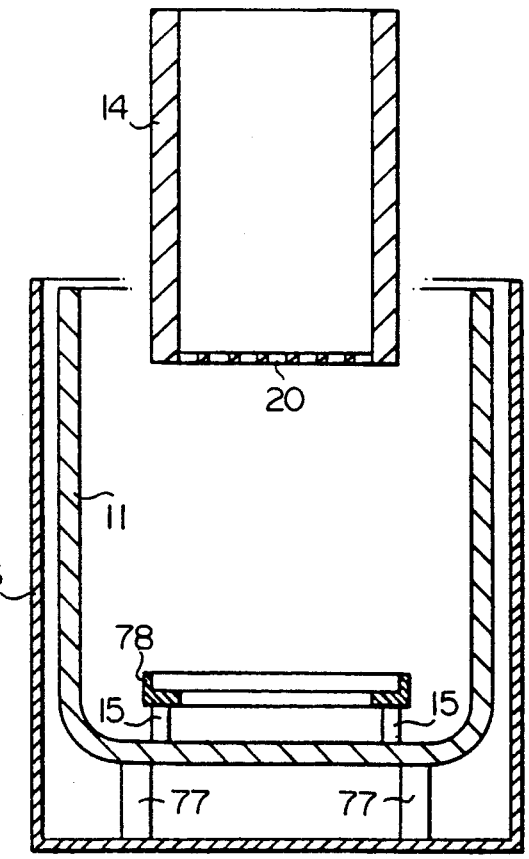

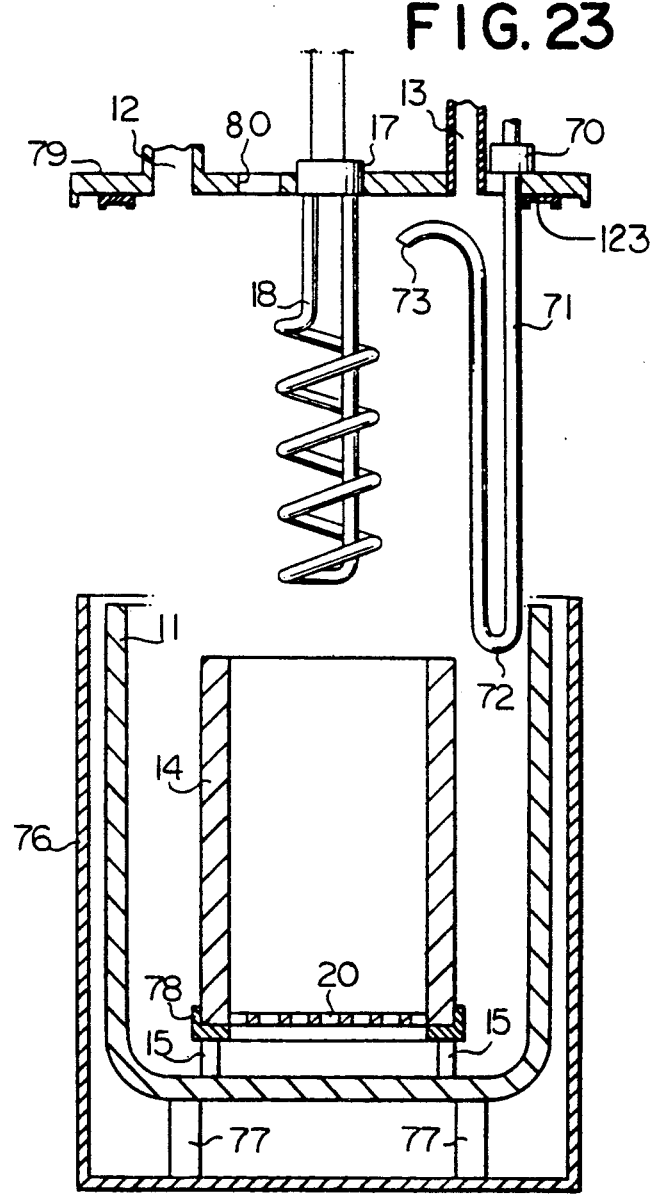

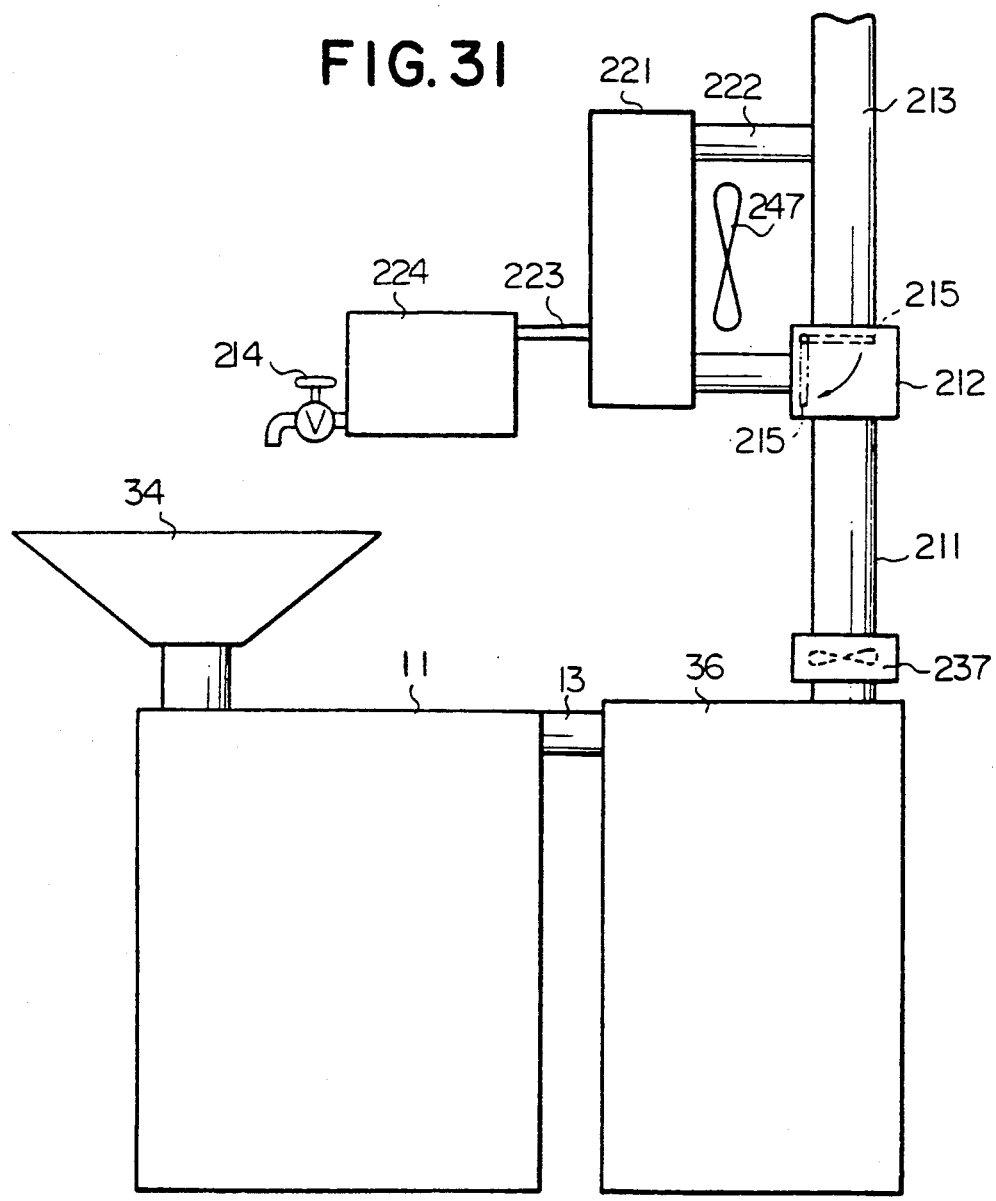

LIQUID EVAPORATOR

BACKGROUND OF THE INVENTION

1. Field of the Invention

The present invention relates to a liquid evaporator for use in evaporating moisture or liquid from dirty waste such as household waste, human waste, industrial waste, sludge, etc.

2. Description of the Prior Art

There is known dirty waste which includes a large volume of moisture or liquid, such as household waste, human waste such as urine, sludge, and industrial waste which waste is subjected to evaporation to separate the liquid. In a known method for evaporating the liquid, the dirty waste is stored in a metallic container such as a pan, and the lower portion of the pan is heated. This method has been effected outdoors.

However, this simple heating of dirty waste causes the liquid to diffuse into the atmosphere, which results in generating a bad odor. Hence, such treatment can not be carried out in or adjacent a city. Furthermore, there are other disadvantages in that an open fire is utilized and a large space is required in effecting such treatment. To solve these problems, it has been proposed that the liquid be evaporated in an air-tight liquid container. A prior evaporator for evaporating the liquid of the dirty waste stored in the air-tight container is described with reference to FIG. 1.

The prior liquid evaporator comprises an air-tight liquid container 1 containing liquid therein, a ceiling integrally mounted therewith, and a heater 5 mounted on the ceiling and positioned in the liquid container 1. More in detail, the liquid container 1 is maintained air-tightly from the outside and has a space therein. Provided on the ceiling of the liquid container are an inlet 2 for introducing the dirty waste and an outlet or discharge port 3 for discharging vapor. The ceiling of the liquid container 1 has a socket 4 fixedly mounted thereon to which the heater 5 is fixed.

With such an arrangement, the dirty waste introduced through inlet 2 is stored in the liquid container 1 as a liquid 6 which contacts the heater 5. In such state, when the heater 5 is energized it causes the liquid 6 to be heated whereby the liquid 6 is gradually changed to a saturated vapor at the upper surface thereof, and the vapor is discharged through the outlet 3 to the outside. This structure is very simple. However, according to such structure, the whole liquid in the liquid container 1 is heated, and the temperature of the whole liquid 6 must be increased in order to generate the saturated vapor from the upper surface thereof.

Hence, there is a problem in that it takes considerable time to evaporate a predetermined amount of the liquid since the temperature of the liquid in the container must be increased as a whole. Furthermore, as the evaporation of the liquid progresses, the liquid depth decreases and the surface area of the liquid in contact with the heater decreases, whereby some of the heat generated by the heater is not transmitted to the liquid, which results in inefficient heat transmission.

Further, the assembly of the prior liquid evaporator, and the disassembly thereof for cleaning the container, takes much time.

Furthermore, even if the prior liquid evaporator is combined with a deodorant device to form a urine treating device, it necessitates a separate device for use in washing hands.

SUMMARY OF THE INVENTION

It is therefore an object of the present invention to provide a liquid evaporator for efficiently evaporating the liquid stored in an air-tight container while remarkably shortening the time required.

To achieve the above objects, the evaporator of the present invention comprises an air-tight liquid container containing liquid therein, the liquid container having legs therein adjacent the bottom thereof; an inner container mounted on the legs for partitioning a space within the liquid container, the inner container having a wall made of an insulating material; and a heater fixed to an upper portion of the liquid container and mounted inside the inner container.

A liquid evaporator is combined with a deodorant device for forming a urine treating device. The urine treating device comprises: a deodorant part having an upper portion; a heating means provided at the upper portion of the deodorant part and having therein a secondary heater; a catalyst surrounding the heater and contained in the deodorant part; a blower means provided outside the deodorant part; and a diffusion pipe provided at the upper portion of the deodorant part.

A modified liquid evaporator comprises an air-tight liquid container containing liquid therein, said liquid container having legs therein fixed adjacent the bottom surface thereof; an inner container mounted on the legs for partitioning a space within the liquid container, said inner container having a wall made of an insulating material; a heater fixed to an upper portion of the liquid container and mounted inside the inner container; a plurality of heat holding balls contained in the inner container; a liquid supply mechanisms for sucking liquid contained in the liquid container and discharging the liquid over the inner container; an upper liquid level detector provided at the upper portion of the liquid container for detecting when the liquid in the liquid container reaches an upper level to thereby actuate the heater to evaporate the liquid; a temperature detector provided inside the inner container for detecting the rise of the temperature of the inner container to actuate the liquid supply mechanism whereby the liquid is discharged over the inner container; and a lower liquid level detector provided at the lower portion of the liquid container for detecting when the liquid in the liquid container reaches a lower level to thereby stop the actuation of the heater.

A still further modified liquid evaporator is combined in a urine treating device with a liquid recovery means, in which the liquid recovery means comprises a joint pipe connected to the upper portion of the deodorant part; a passage shifting means connected to an upper end of the joint pipe for shifting the flow passage of the liquid supplied from the joint pipe; a diffusion pipe connected to the upper portion of the passage shifting means; a branching pipe extended perpendicularly to the passage shifting means; a cooling device connected to the branching pipe; a discharge pipe provided over the upper side of the cooling device and connected to the side surface of the diffusion pipe for discharging the air after recovering the liquid from the vapor; a liquid pipe provided at the front lower portion of the cooling device and protruded therefrom for discharging the liquid obtained by cooling the saturated vapor; and a liquid tank connected to the liquid pipe for storing the liquid flowing out from the liquid pipe, said liquid tank being provided with a valve cock at the front lower portion thereof.

The above and other objects, features and advantages of the present invention will become more apparent from the following description taken in conjunction with the accompanying drawings.

BRIEF DESCRIPTION OF THE DRAWINGS

FIG. 3 is a cross sectional view of a liquid evaporator according to a second embodiment of the present invention;

FIG. 4 is a cross sectional view of a liquid evaporator according to a third embodiment of the present invention;

FIG. 5 is a view for explaining the operation of the liquid supply means employed in the liquid evaporator of FIG. 4;

FIG. 6 is a perspective view of a first embodiment of a urine treating device which incorporates the liquid evaporator according to the present invention combined with a deodorant device;

FIG. 20 is a flow chart for explaining the operation of the control system for the modified embodiment of FIG. 18;

FIGS. 21 through 24 are views for explaining the sequence of assembling a typical example of the liquid evaporator of the present invention;

FIG. 31 is a view for explaining the flow passage of the liquid and vapor in the device of FIGS. 28-30.

The above and other objects, features and advantages of the present invention will become more apparent from the following description taken in conjunction with the accompanying drawings.

DETAILED DESCRIPTION

Figure 1:
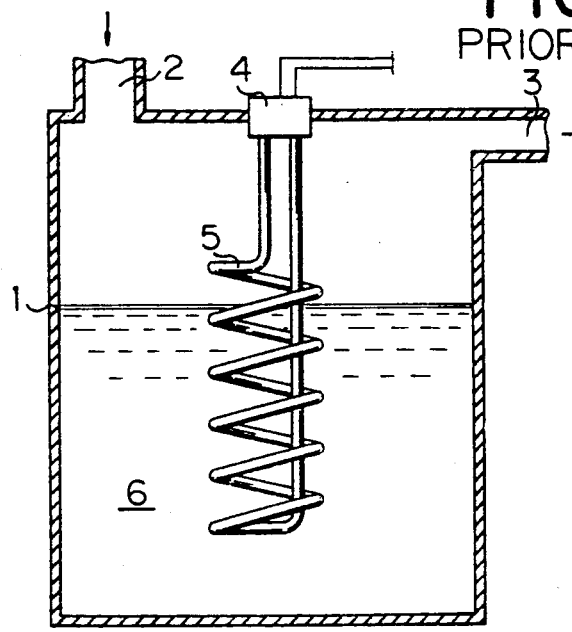
FIG. 1 is a cross sectional view of a prior art liquid evaporator.
Figure 2:
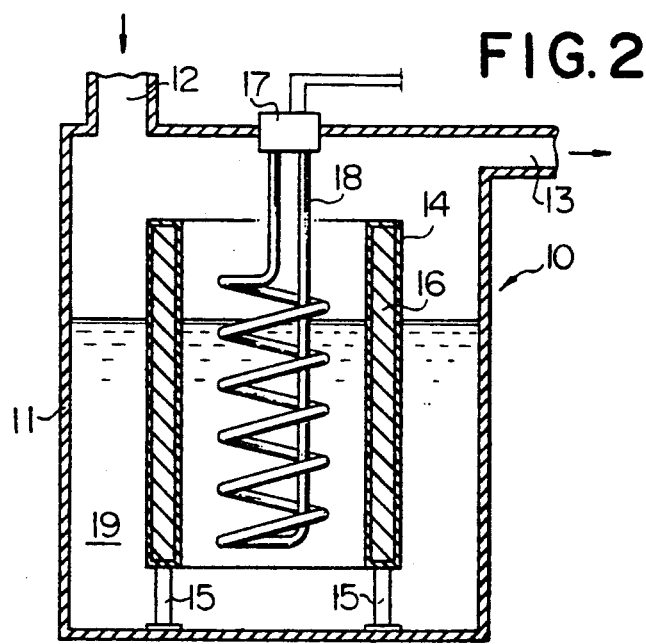
FIG. 2 is a cross sectional view of a liquid evaporator according to a first embodiment of the present invention.

Embodiment of FIG. 2

A first embodiment of the invention will be described with reference to FIG. 2.

The liquid evaporator 10 includes a hollow outer container 11 which is made of a metal and is air-tightly closed. An inlet 12 communicates with the top of the chamber defined within the container 11 for introducing dirty waste therein, which inlet at its other end communicates with a dirty waste container (not shown). An outlet or discharge port 13 also communicates with the top of the chamber for discharging saturated vapor therefrom.

The chamber within the liquid container 11 is preferably of an upright cylindrical configuration and is provided therein with an inner container 14 made of a metal such as a stainless steel etc. The lower end of the inner container 14 is mounted on legs 15 which are fixedly mounted on the bottom surface of the liquid container 11 and which project upwardly therefrom. The inner container 14 is a substantially hollow cylinder which is concentrically positioned within the outer container and which is open at the upper and lower ends thereof. The upper and lower ends of the inner container are spaced downward and upwardly, respectively, from the respective top and bottom walls of the outer container. The hollow cylindrical body of the inner container 14 is a double walled structure, namely having outer and inner walls which define therebetween a hollow annular region which is filled with a thermal insulating material 16. The chamber or space in the liquid container 11 is partitioned by the inner container 14 into an inner space within the inner container 14 and an outer annular space which surrounds the inner container. These inner and outer spaces, however, are in open communication with one another through the open ends of the inner container 14. Positioned in the inner space of the inner container 14 is a coil-shaped heater 18 which is fixed at the upper portion thereof to a connector or socket 17 fixed to a top wall of the outer container 11.

The operation of the FIG. 2 embodiment of the liquid evaporation will be described herewith.

The dirty waste is introduced through inlet 12 into the outer container 11. The dirty waste is stored in the container 11 as a liquid 19, and the upper surface level of the liquid is maintained below the upper end of inner container 14. The dirty waste thus contacts the heater 18. Also, the upper surface of the liquid 19 is partitioned in two sections by the inner container 14, although the liquid 19 stored inside and outside the inner container 14 communicate with each other below the lower end of the inner container 14 since there is defined an open space between the bottoms of the outer container 11 and the inner container 14. When the heater 18 is energized, primarily only the liquid 19 inside the inner container 14 is heated to generate saturated vapor from the upper surface of the liquid 19 stored inside the inner container 14. Thus the liquid 19 is successively evaporated. The heat generated by the heater 18 can not be readily transmitted outside of the inner container 14 since it is insulated by the insulating cylindrical body 16. Hence, the liquid outside (i.e. surrounding) the inner container 14 is not heated. Rather, only the liquid inside the inner container 14 (which liquid has less surface area and less volume) is heated to thereby raise the liquid temperature and generate the vapor. The resultant vaporized liquid is thus successively evaporated from the inside of the inner container 14.

The insulated inner container 14 functions as a heat concentration arrangement cooperable with the heater 18 for effecting a concentration of liquid heating in only a localized volume of liquid in the outer container 11 by resisting heat flow from the localized volume of liquid to the remaining liquid in the outer container 11.

Inasmuch as the inner container 14 has an insulating function, the heat generated by the heater 18 heats only the inside of the inner container 14, but does not heat the liquid outside the inner container 14 nor the outer container 11 per se.

Embodiment of FIG. 3

A second embodiment of the invention will be described with reference to FIG. 3.

The inner container 14 has a metal screen or net 20 provided at the lower open end thereof. Positioned within the inside of the inner container 14 is a plurality of heat holding balls 21 made of ceramic materials such as alumina (AlO$_2$), pumice, unglazed porcelain, stainless steel, etc. The heat holding balls 21 are retained in the inner container 14 by the bottom screen 20 and fill the container 14 to a level adjacent to the upper open end thereof. These balls 21 surround the whole heater 18.

The operation of the liquid evaporator according to FIG. 3 will be described herewith.

When the dirty waste is introduced from inlet 12 and stored in the container 11 as liquid 19, the liquid 19 also flows into the inner space of the inner container 14 through the net 20, whereby the liquid 19 fills the spaces defined between the heat holding balls 21. The heat generated by the heater 18, upon energization thereof, first heats the liquid 19 inside the inner container 14 and the heat holding balls 21. Although the liquid 19 inside the container 14 and the heat holding balls 21 are heated by the heater 18, and the liquids inside and outside the container 14 communicate via the lower opening in the container 14, still the liquid outside the inner container 14 is not readily heated due to the insulated wall of the container 14. Thus, the small volume of liquid 19 inside the inner container 14 is first heated and evaporated.

Inasmuch as the heat holding balls 21 are made of materials such as ceramic and the like for retaining the heat, the heat holding balls 21 absorb the heat generated by the heater 18 and radiate the absorbed heat from the surface thereof. Inasmuch as the total surface areas of the heat holding balls 21 is large, when the heat generated by each heat holding balls 21 heats the liquid 19 surrounding the ball, the speed of heating of the liquid 19 is remarkably increased.

Furthermore, the speed of evaporation of the liquid 19 is remarkably increased due to the fact that the quantity of liquid 19 stored inside the inner container 14 is reduced to a small volume since the plurality of heat holding balls 21 fill a substantial part of the space inside the inner container 14.

Embodiment of FIGS. 4 and 5

In a third embodiment of the invention as illustrated by FIGS. 4 and 5, the evaporator 10 also has a substantially U-shaped liquid supply pipe 22 associated therewith. The supply pipe 22 has an open discharge end 22a positioned at the upper opened end of the inner container 14, and then extends downward inside the inner container 14 where, at the lower portion of the inner container 14, it joins to a U-shape which extends upward in the space between the inner side of the outer container 11 and the outer side of the inner container 14, and then communicates with the outside at the upper portion of the liquid container 11. The liquid supply pipe 22 has an opened suction port at the U-shaped lower portion thereof, and the other end of pipe 22 is connected to an air pump 24 at a location disposed outside the outer container 11, whereby atmospheric air can be introduced into the container 11 through the air pump 24.

The operation of the liquid evaporator according to FIG. 4 will be described herewith.

As with the FIG. 3 embodiment, the heater 18 is energized to heat the liquid 19 and the heat holding balls 21, whereby the liquid 19 inside the inner container 14 is first evaporated. At this time, air is introduced by the air pump 24 through the liquid supply pipe 22 and discharged toward the open upper surface of the inner container 14. When the air from the air pump 24 is supplied into the pipe 22, the air within the pipe 22 passes the suction port 23. Since the suction port 23 communicates with the liquid 19 stored in the container 11, the liquid 19 is sucked into the liquid supply pipe 22 through the suction port 23 and flows through the liquid supply pipe 22 in a state where the air and liquid are intermittently mixed with each other, and are finally jetted through the opening 22a toward the upper space of the inner container 14.

FIG. 5 shows the state where the liquid 19 is sucked into the liquid supply pipe 22 as air passes the suction port 23. The liquid 19 is intermittently introduced into the liquid supply pipe 22 and supplied into the liquid supply pipe 22 following the air, namely the liquid and the air is alternately supplied into the liquid supply pipe 22. Therefore, the liquid 19 is fed toward the open end 22a of the liquid supply pipe 22 while it is held between the air as illustrated at B, C, D, E in FIG. 5. The liquid sucked from the suction port 23 is jetted together with the forcibly supplied air, from the open end 22a of the liquid supply pipe 22 toward the upper portion of the inner container 14. The jetted liquid 19 flows downwardly for contact with the heat holding balls 21. The heat holding balls 21, particularly those positioned at the upper portion of container 14 which are not in contact with the liquid 19 due to lowering of the liquid level, are first dampened by the jetted liquid 19 which is evaporated rapidly by the heat of the heat holding balls 21.

At the same time, the air introduced into the container 11 from the pipe 22 is discharged through the discharge port 13 to the outside. The saturated vapor in the upper portion of the air-tight liquid container 11 is discharged, together with the air supplied by the pipe 22, so that saturated vapor is not retained in the container 11. Hence, the container 11 is kept at a humidity less than that of the saturated vapor so as to enable the apparatus to carry out the evaporation of the liquid within the inner container 14.

Figure 7:
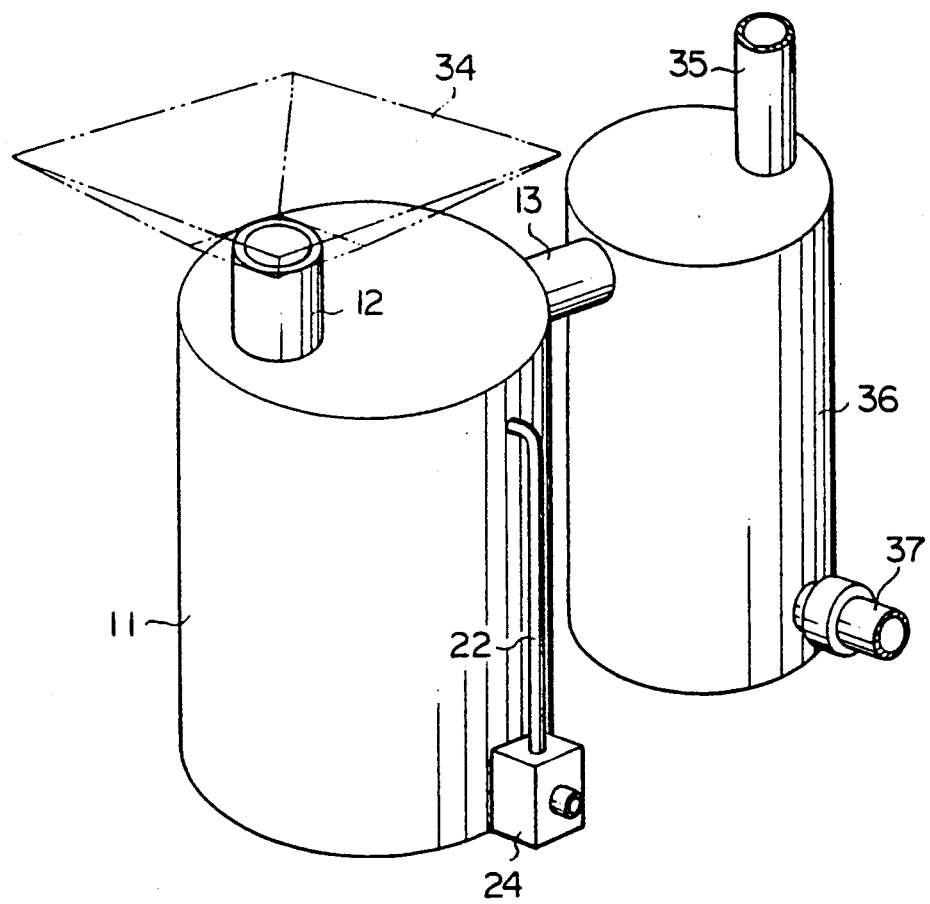
FIG. 7 is a view showing the inside constituents of the urine treating device of FIG. 6.
Figure 8:
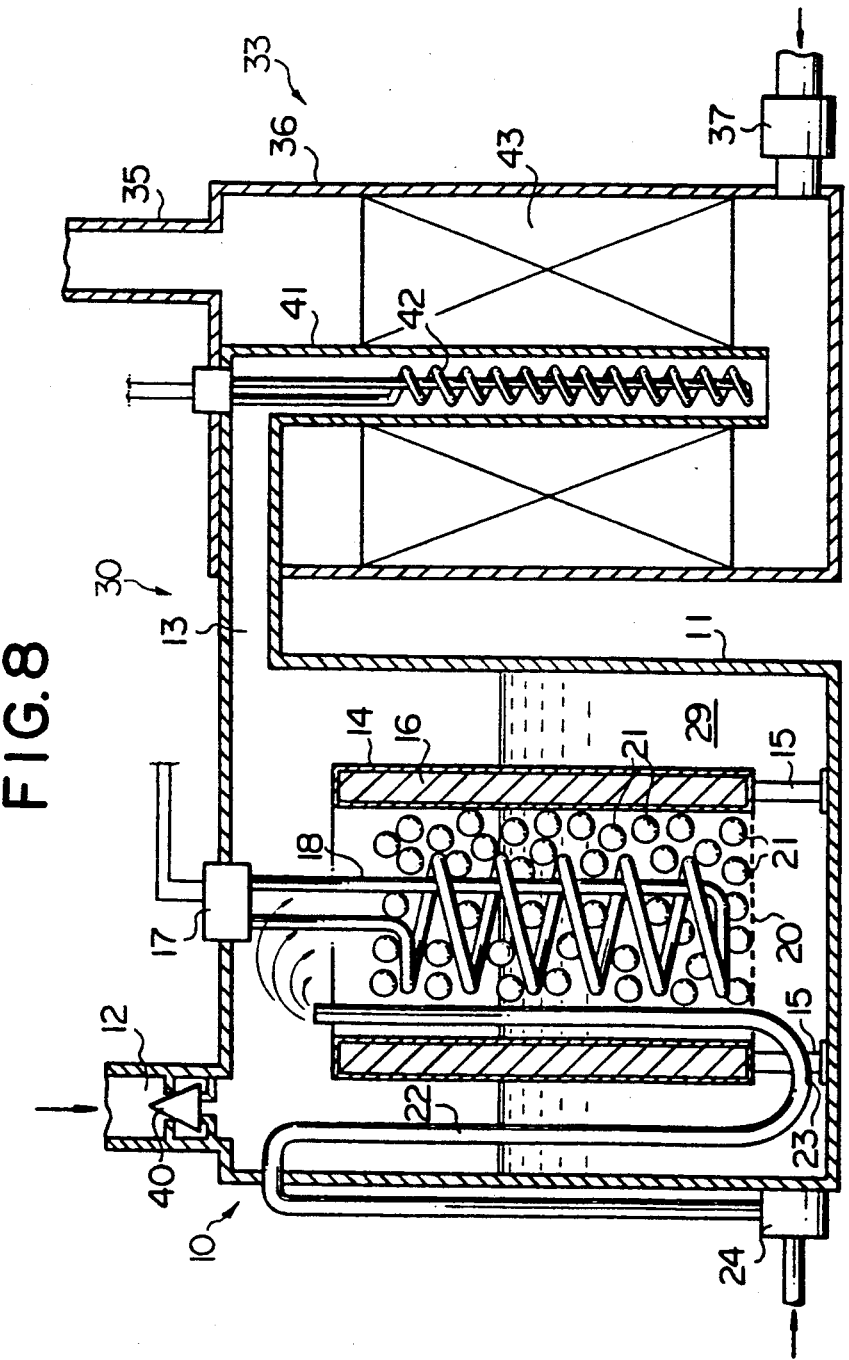
FIG. 8 is a cross sectional view of the urine treating device of FIG. 6.

Device of FIGS. 6 to 8

Next, there is described the case where the liquid evaporator is employed as part of a treating device 30 for enabling evaporation of the liquid (i.e. water) from urine. The urine treating device 30 is used, for example, in a factory, a villa or a ship having no sewer system. Only the water, which is the main component of urine, is evaporated to the atmosphere so that the treating of the dirty waste can be effected for a long time. Accordingly, the urine treating device can be utilized in a semiconductor factory where contact with the outside is prohibited, or in an atomic power plant, or an installation can be provided in a bus or a train.

The urine treating device 30 has a cubic shape as a whole and is provided with a base 31 having the liquid evaporator 10 at a front portion thereof and a deodorizing device 33 at a rear portion thereof. The liquid evaporator 10 has a urine receiver 34 at the upper portion thereof which is opened at the front end thereof. The deodorizing device 33 has a chimney-like diffusion pipe 35 projecting upwardly thereof.

The structure of the urine treating device 30 will be described in more detail with reference to FIGS. 7 and 8.

The urine receiver 34 has the inlet 12 connected to the urine receiver 34. The urine, such as discharged from a human, is stored in the container 11, which in turn is positioned within an outer casing. The deodorizing device 33 has inside the outer casing thereof a cylindrical part or housing 36 which is connected to the container 11 through the discharge port 13. The discharge port 13 communicates between the container 11 and the heat pipe 41 provided inside the deodorizing housing 36. The housing 36 has adjacent a lower portion thereof, but outside thereof, a blower means 37 for forcibly feeding air into the housing 36 from the outside.

The structure of the liquid container 11 in FIG. 8 is the same as that of the third embodiment in FIG. 4. The dirty waste is introduced into the liquid container 11 through the inlet 12. The dirty waste is prevented from flowing backwards by a trap or one-way valve 40 provided inside the inlet 12. The discharge port 13 communicates with the inside of the heat pipe 41. The heat pipe 41 has a cylindrical pipe shape and is disposed at the center of the ceiling of the housing 36 and is directed perpendicularly downward therefrom. The heat pipe 41 has inside thereof a secondary heater 42 for re-heating the saturated vapor. The inside of the housing 36 is partitioned by the heat pipe 41 extending centrally thereof. A catalyst 43 of a metal net made of platinum is inserted into the annular space defined between the inside of the housing 36 and the outside of the heat pipe 41. The blower means 37 functions to feed air from outside into the inside of the housing 36 at a location under the catalyst 43. The lower open end of heat pipe 41 also communicates with this same bottom region.

The operation of the urine treating device 30 according to FIGS. 6-8 will now be described.

The urine 29 collected by the urine receiver is stored in the container 11. The urine 29 is stored in the liquid container 11 until it reaches a predetermined volume or liquid level. Then the heater 18 is energized to heat the urine and the heat holding balls 21 as disposed inside the inner container 14. Simultaneously, air is fed into the supply pipe 22 by the pump 24, whereby urine 29 is drawn through the suction port 23 located in the lower portion of the liquid container 11. The urine 29 sucked through pipe 22 is dispersed toward the heat holding balls 21 from adjacent the upper portion of the inner container 14. The urine 29 inside the inner container 14 heated by the heat from the heater 18 and the heat holding balls 21 is evaporated and changed to saturated vapor, and then retained in the upper space of the liquid container 11. Inasmuch as the air from the outside is always fed into the liquid container 11 by the air pump 24, the saturated vapor which collects in the upper space of the liquid container 11 is directed toward the deodorizing housing 36 through the discharge port 13.

Thus, the saturated vapor passes into the inside of the housing 36. At this time, since the secondary heater 42 is energized, it is always in a condition to effect heating. The saturated vapor including the urine odor contacts the secondary heater 42 whereby it is re-heated and then discharged from the lower end of the heat pipe 41. The saturated vapor of the urine 29 as evaporated in the liquid container 11 includes components such as ammonia and bromine which create an undesirable odor or smell. The saturated vapor including such bad odor, after being reheated by the secondary heater 42, then flows upwardly and contacts the catalyst 43 whereby the bad smell is removed. The remaining vapor and air is then discharged from the diffusion pipe 35 to the atmosphere. Since air is fed into the deodorizing housing 36 from outside by the blower means 37, the heated saturated vapor is forcibly discharged outside through the diffusion pipe 35.

With such a successive operation, only the liquid of the urine among those collected by the urine receiver 34 is evaporated, and the components constituting the bad smell becomes odorless with the use of catalyst 43, so that most of the liquid of the urine is diffused to the atmosphere as vapor.

Figure 9:
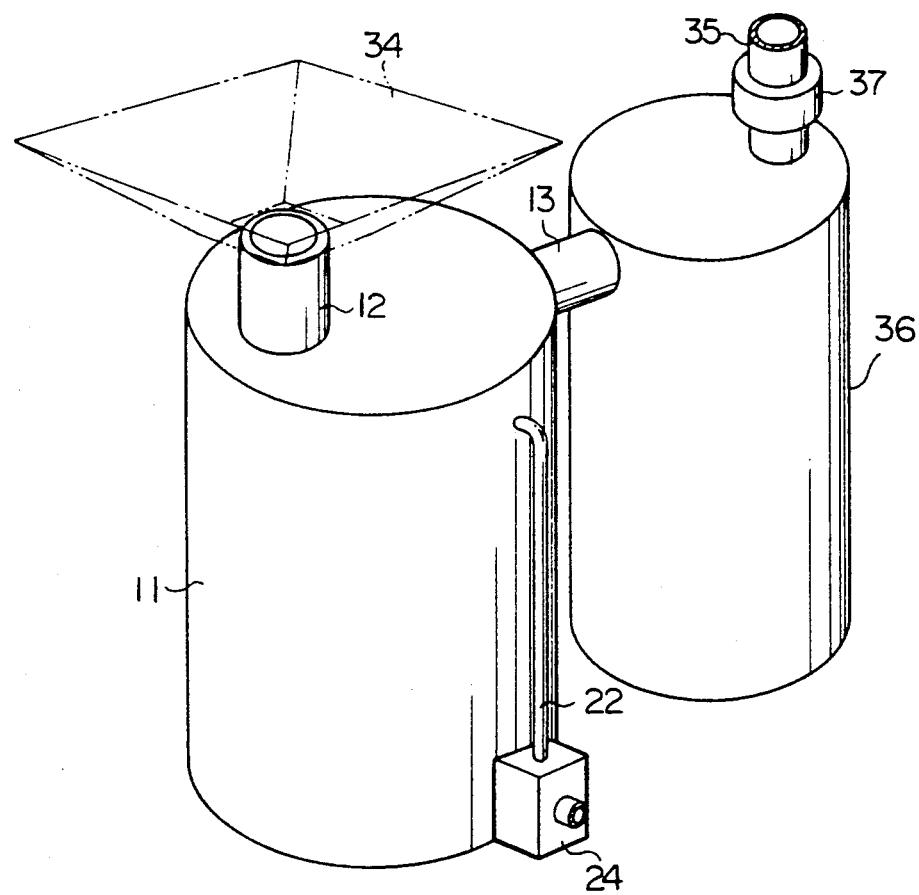
FIG. 9 is a perspective view of a second embodiment of a urine treating device.
Figure 10:
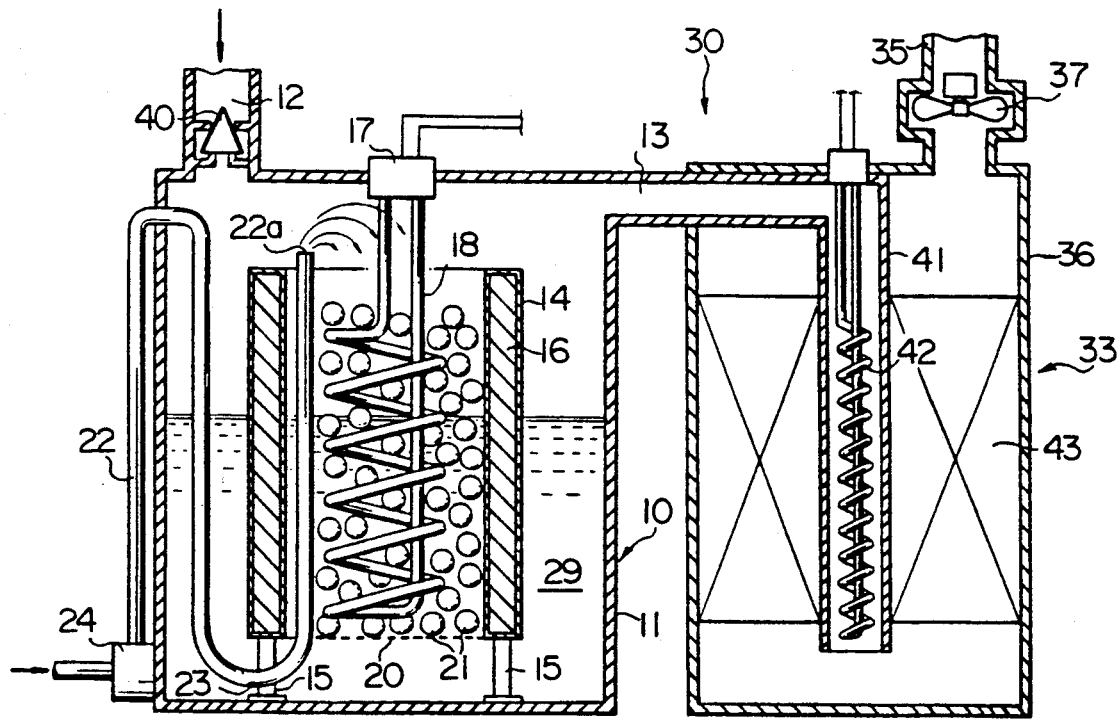
FIG. 10 is a cross sectional view of the urine treating device of FIG. 9.

Modified Device of FIGS. 9 and 10

A second embodiment of the urine treating device according to the present invention will be described with reference to FIGS. 9 and 10.

The urine treating device of this second embodiment is different from that of the embodiment shown in FIGS. 6 through 8 with respect to the location of the blower means. The blower means 37 according to this second embodiment is incorporated directly into the diffusion or discharge pipe 35 so that the saturated vapor is sucked upwardly past the catalyst.

Figure 11:
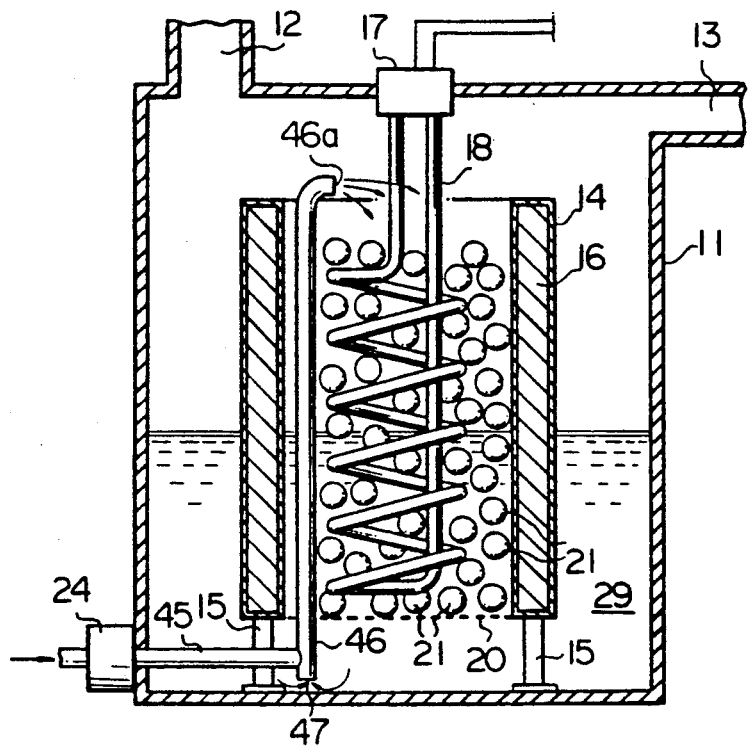
FIG. 11 is a cross sectional view of a liquid evaporator according to a fourth embodiment of the present invention.
Figure 12:
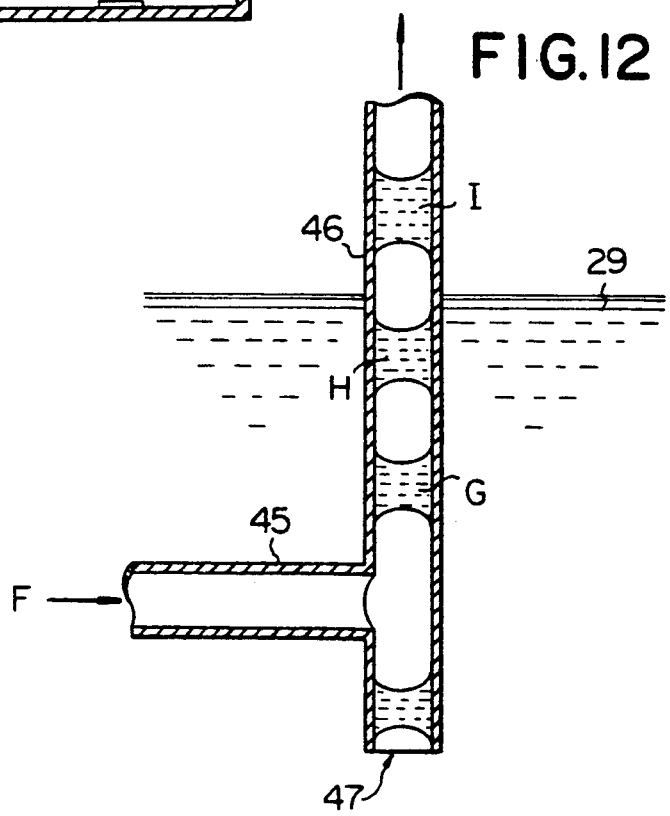
FIG. 12 is a view for explaining the operation of the liquid supply means employed in the liquid evaporator of FIG. 11.

Embodiment of FIGS. 11 and 12

A fourth embodiment of the invention will now be described with reference to FIGS. 11 and 12.

According to this fourth embodiment, an air supply pipe 45, which connects to an air pump 24 provided outside the container 11 adjacent a lower portion thereof, extends horizontally inside the container 11 and connects in a T-shape to a liquid supply pipe 46. The pipe 46 is directed perpendicularly in the upward and downward directions. A suction port 47 is provided at the lower end of supply pipe 46 at a position slightly above the bottom surface of the container 11.

With this arrangement, the air supplied from outside by the air pump 24 is fed through the air supply pipe 45 and then flows through the upper portion of supply pipe 46, and is jetted from the opening 46a toward the upper portion of the inner container 14. Inasmuch as the air is supplied from the outside through the supply pipe 46 while the urine 29 is drawn in through the suction port 47, the liquid and the air are jetted from the opening 46a toward the upper open end of the inner container 14.

The state where the urine 29 in the liquid container 14 is drawn into the lower portion of the liquid supply pipe 46 is illustrated in FIG. 12.

The air F supplied by the air pump 24 is delivered to the liquid supply pipe 46 through the air supply pipe 45. Since the air F is light weight, the air F flows upwardly at the junction between the pipes 45 and 46, while the urine 29 is drawn into the suction port 47 and raised from the lower portion to the upper portion of the liquid supply pipe 46 in the manner that the air and the liquid are spaced and intermittently fed therethrough as illustrated at G, H, I in FIG. 12. Accordingly, the urine 29 is fed through the liquid supply pipe 46 together with the air F and jetted from the upper open end thereof, and dispersed toward the heat holding balls 21.

Figure 13:
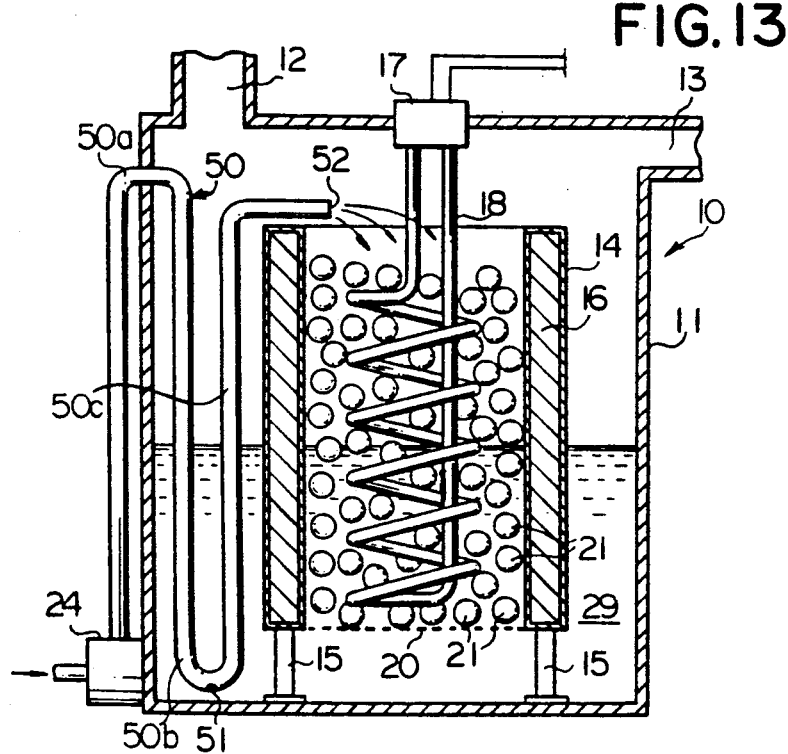
FIG. 13 is a cross sectional view of a liquid evaporator according to a fifth embodiment of the present invention.

Embodiment of FIG. 13

A fifth embodiment of the invention is described hereinafter with reference to FIG. 13.

According to this embodiment, a liquid supply pipe 50 which connects to the air pump 24 provided outside the container 11 has an upper U-shaped portion 50a adjacent the top of the liquid container 11 and a lower U-shaped portion 50b adjacent the bottom of the container 11 in the space defined between the inside of the container 11 and the outside of the inner container 14. The lower U-shaped portion 50b is positioned slightly above the bottom surface of the liquid container 11 and has a suction port 51 at the lowest part thereof. The lower U-shaped portion 50b is directed upwardly and the discharge leg 50c thereof, at its upper end, is bent in an L-shape so that the open end 52 thereof is positioned toward the upper open end of the inner container 14.

With such an arrangement, when the air pump 24 is actuated to supply outside air to the supply pipe 50, the urine 29 is drawn through the suction port 51 and raised upwardly for discharge through the outlet 52. By jetting the air and urine over the upper portion of the inner container 14, the urine is atomized over the heat holding balls 21, and the liquid of the urine is evaporated by the heat from the heat holding balls 21.

Figure 14:
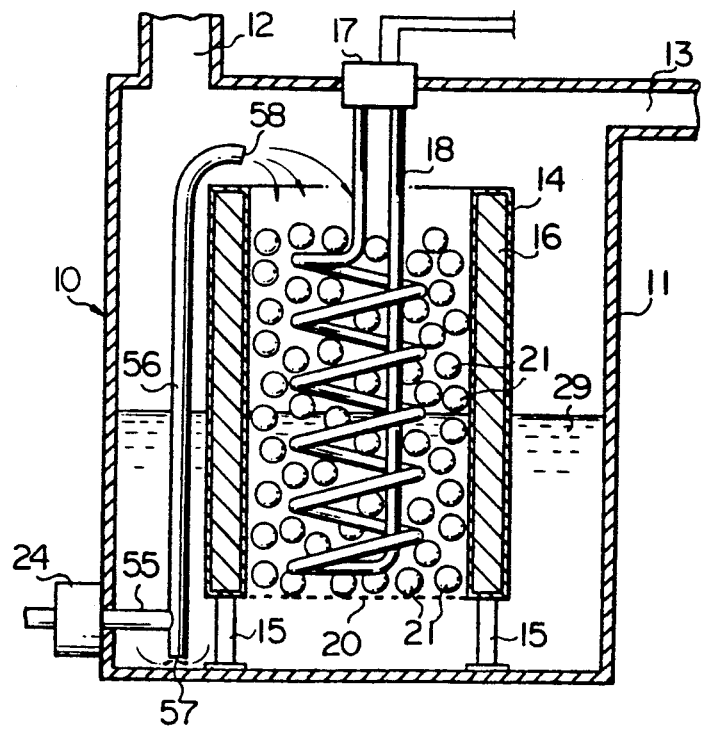
FIG. 14 is a cross sectional view of a liquid evaporator according to a sixth embodiment of the present invention.

Embodiment of FIG. 14

A sixth embodiment of the present invention is described below with reference to FIG. 14.

According to this sixth embodiment, an air supply pipe 55, which connects to the air pump 24 provided outside the liquid container 11, is positioned in the lower portion of the container 11 and connects at a T-shape to a liquid supply pipe 56. The open lower end 57 of supply pipe 56 is positioned slightly above the bottom surface of the container 11. The pipe 56 extends upwardly in the annular space between the inside of the outer container 11 and the outside of the inner container 14. The upper end of the supply pipe 56 is curved in a circular arc and the open end or discharge port 58 thereof is directed toward the open upper space of the inner container 14.

Upon actuation of the air pump, air from the outside is fed through the air supply pipe 55 into the liquid supply pipe 56 to cause urine 29 to be drawn into the suction port 57 and fed upward through the liquid supply pipe 56 and discharged into the upper portion of the inner container 14.

Figure 15:
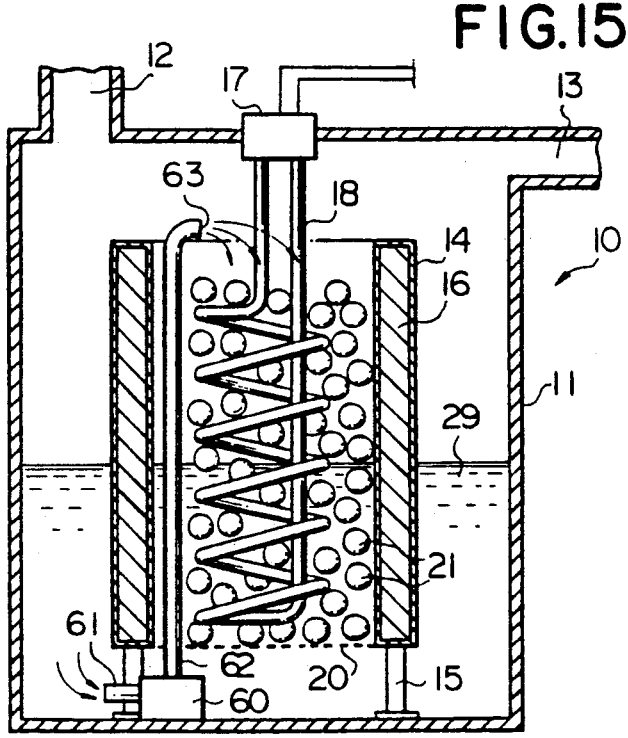
FIG. 15 is a cross sectional view of a liquid evaporator according to a seventh embodiment of the present invention.

Embodiment of FIG. 15

A seventh embodiment of the invention will now be described with reference to FIG. 15.

Fixedly provided on the bottom surface of the container 11 is a submergible pump 60 which has at the inlet end a suction pipe 61 positioned adjacent the bottom wall of the container 11. The discharge end of pump 60 has a liquid supply pipe 62 connected thereto. The pipe 62 extends perpendicularly upwardly in the space within the inner container 14 and has a curved upper portion provided with a discharge port 63 at the tip end thereof which is directed toward the upper portion of the inner container 14.

Upon actuation of the pump 60, the urine 29 stored in the liquid container 11 is drawn through the suction pipe 61 and delivered to the liquid supply pipe 62. The urine 29 delivered to the liquid supply pipe 62 is raised upward and discharged from the discharge port 63 toward the upper portion of the inner container 14. Hence, the urine 29 discharged from the discharge port 63 successively dampens the surfaces of the heat holding balls 21 and is evaporated by the heat from the heat holding balls 21.

Figure 16:
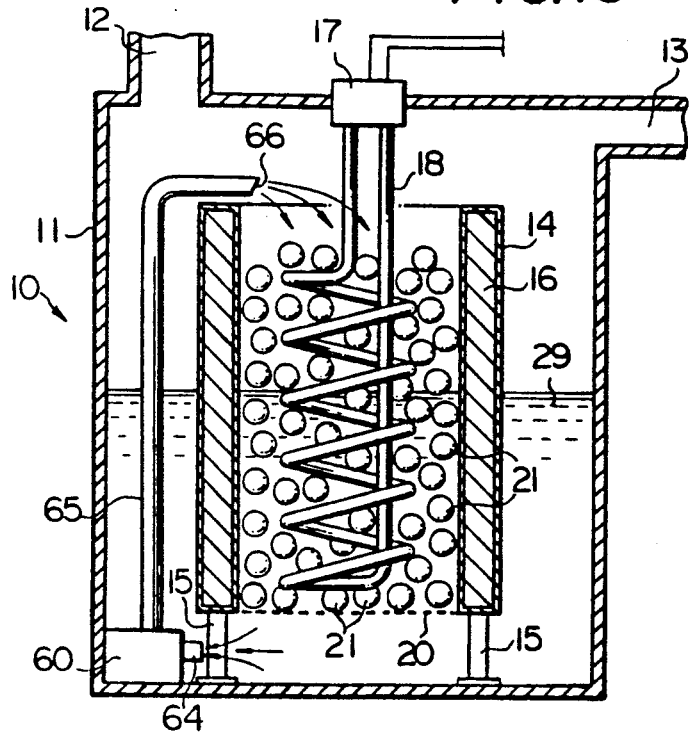
FIG. 16 is a cross sectional view of a liquid evaporator according to an eighth embodiment of the present invention.

Embodiment of FIG. 16

An eighth embodiment of the present invention will be described hereinafter with reference to FIG. 16.

According to this embodiment, fixedly provided on the bottom surface of the container 11 is the submergible pump 60 which has its inlet end connected to a suction pipe 64 positioned adjacent the bottom of the container 11. Pump 60 has the discharge side thereof connected to a liquid supply pipe 65. The supply pipe 65 is positioned in the annular space defined between the inside of the outside container 11 and the outside of the inner container 14. Pipe 65 extends perpendicularly upwardly and has its upper portion slightly bent in an L-shape. The L-shaped upper portion has at the tip end thereof a discharge port 66 directed toward the open upper portion of the inner container 14.

Upon actuation of the pump 60, the urine 29 drawn through the suction pipe 64 is fed to the liquid supply pipe 65 and discharged into the upper portion of the inner container 14. The urine 29, as discharged from the discharge port 66, successively dampens the surfaces of the heat holding balls 21 from the upper portion toward the lower portion of the container 14. The liquid of the urine 29 is evaporated by the heat from the heat holding balls 21.

Figure 17:
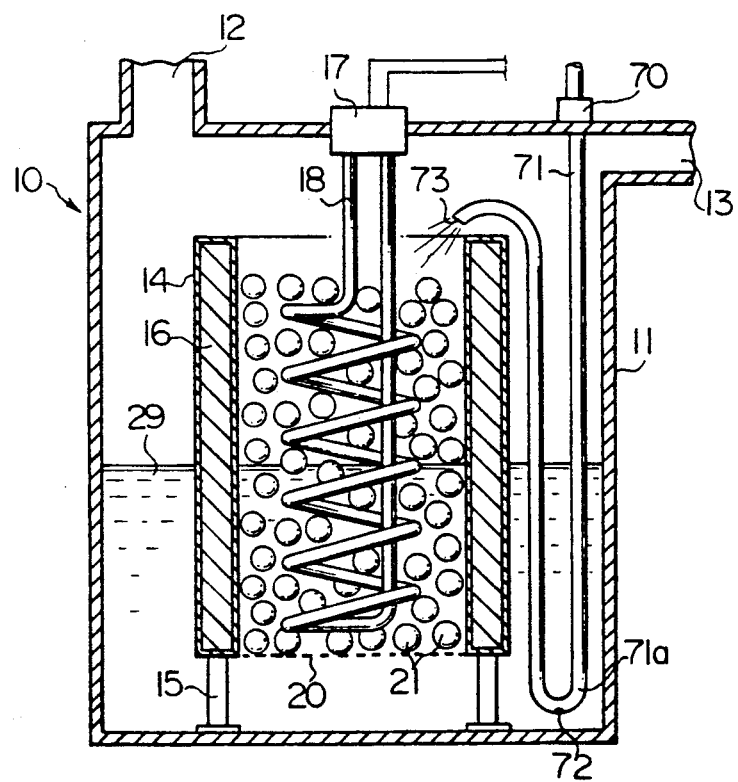
FIG. 17 is a cross sectional view of a liquid evaporator according to a ninth embodiment of the present invention.

Embodiment of FIG. 17

A ninth embodiment of the invention will now be described with reference to FIG. 17.

According to this embodiment, a liquid supply pipe 71 connects to an air pump 70 which is fixedly mounted over the top wall of the liquid container 11, then extends downward from the top wall to a point close to the bottom wall, and is then reversely turned upwardly, to form a U-shaped portion 71a which is positioned in the space between the inside of the outer container 11 and the outside of the inner container 14. The liquid supply pipe 71 has a suction port 72 in the lower part of the U-shaped portion 71a, and has at the tip end thereof a discharge port 73 directed toward the upper portion of the inner container 14.

The urine 29 drawn through the suction port 72 of the liquid supply pipe 71 is discharged from the discharge port 73 toward the upper portion of the inner container 14, together with the air forcibly fed by the air pump 70, whereby the liquid of the urine 29 is evaporated by the heat from the heat holding balls 21.

Figure 18:
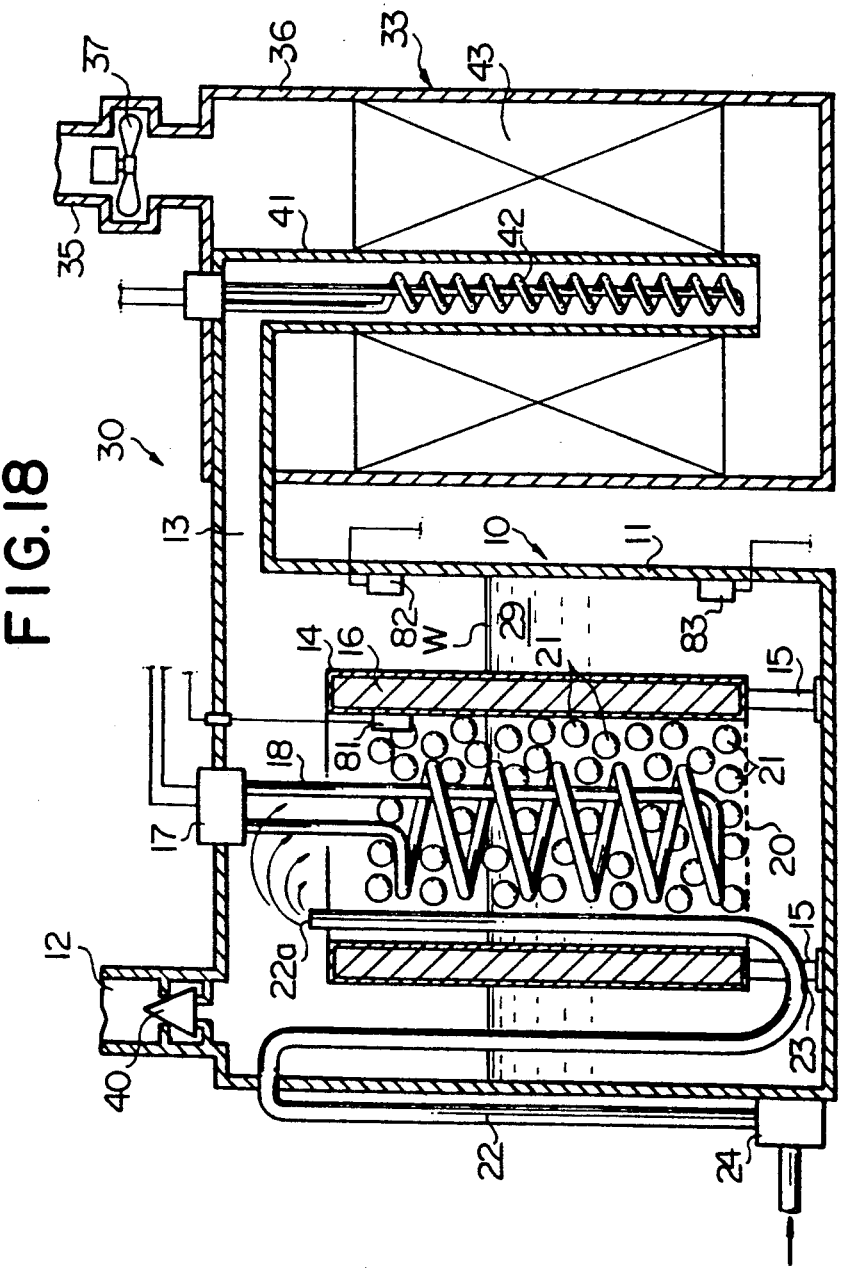
FIG. 18 is a perspective view of a third embodiment of a urine treating device as provided with a control system.
Figure 19:
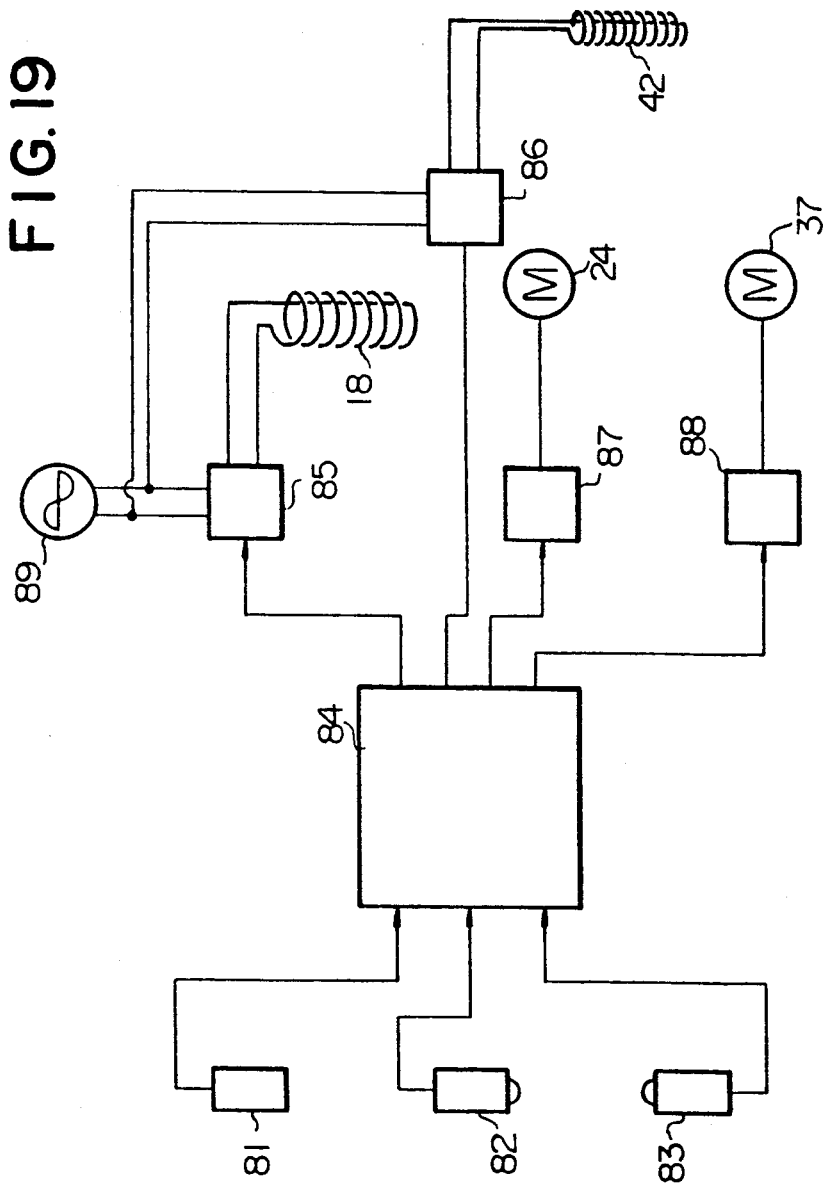
FIG. 19 is a circuit diagram of the control system for the modified embodiment of FIG. 18.

Modified Device of FIGS. 18 to 20

A third embodiment of the urine treating device will now be described with reference to FIG. 18. The urine treating device of FIG. 18 is provided with a control system, but otherwise has the same constitution as that of the device illustrated by FIGS. 9 and 10 as described above.

The control system includes: a temperature detector 81 for measuring the temperature of the liquid stored in the inner container 14, which detector 81 is provided within the upper inner portion of the inner container 14; and an upper liquid level detector 82 and a lower liquid level detector 83 for respectively detecting the liquid level W in the container 11, which detectors 82 and 83 are provided at the upper inner portion and lower inner portion respectively of the container 11.

The control system will be described with reference to FIGS. 19 and 20.

Outputs of the temperature detector 81, the upper liquid detector 82, and the lower liquid detector 83 are respectively inputted to a control circuit 84 including a CPU (central processing unit). The outputs of the control circuit 84 are respectively supplied to switching circuits 85, 86, 87, and 88. Connected to the switching circuit 85 is the electric heater 18. Connected to the switching circuit 86 is the secondary electric heater 42. A power source 89 is connected to the switching circuits 85 and 86. The air pump 24 is connected to the switching circuit 87, and the blower means 37 is connected to the switching circuit 88.

The urine 29 discharged from a human is collected by the urine receiver and passes through the inlet pipe 12 and the trap 40, and is stored in the liquid container 11. The urine 29 can be collected and stored in the container 11 until the liquid level W reaches the upper liquid level detector 82. When the upper liquid level detector 82 detects that the liquid level W reaches this predetermined level, then it issues a signal. The signal issued by the upper detector 82 is delivered to the control circuit 84 which actuates the switching circuits 85, 86, 88. The switching circuits 85 and 86 respectively energize the heater 18 and the secondary heater 42. The switching circuit 88 energizes the blower means 37 to thereby discharge the air in the deodorizing housing 36 to the outside. When the heater 18 is energized to heat the urine 29 and the heat holding balls 21 in the inner container 14, the liquid (i.e. water) of the urine 29 is successively evaporated. The heat from the heater 18 heats the whole of the urine 29 inside the inner container 14 to thereby evaporate the liquid of the urine 29 from the open upper end of the inner container 14. However, with evaporation of the liquid accompanied by lowering of the liquid level W, the upper portion of the heater 18 and the heat holding balls 21 located in the upper portion of container 14 are exposed, which results in non-contact with the urine 29. However, inasmuch as the heater 18 is still energized, the temperature of the heat holding balls 21 located in the upper portion of container 14 are gradually successively increased. When the temperature of the inner upper portion of the inner container 14 is raised above a predetermined value (such as about 120° C. to about 130° C.) the temperature sensor 81 issues a signal to the control circuit 84 which actuates the air pump 24.

When the air pump 24 is actuated the air from the outside is fed into the liquid supply pipe 22 and is forcibly introduced into the liquid container 11. Upon supplying of the air by the air pump 24 to the liquid supply pipe 22, the air passes by the suction port 23 and is jetted from the upper open end 22a thereof. Since the suction port 23 is provided at a position adjacent to the bottom surface of the liquid container 11, the urine 29 is drawn through the suction port 23 and fed into the liquid supply pipe 22 in a state where urine 29 and air are intermittently mixed. The mixed air and urine 29 are fed through the liquid supply pipe 22 and jetted toward the upper portion of the inner container 14 whereby they dampen the heater 18 having a high temperature and the surfaces of the heat holding balls 21 located in the upper portion thereof to thereby lower the high temperature and evaporate the liquid of the urine 29 by the heat form the heat holding balls 21.

The urine 29 drawn from the suction port 23 is jetted from the discharge port 22a together with the air supplied by the liquid supply pipe 22. The jetted urine 29 flows from the upper portion toward the lower portion of the inner container 14 over the heat holding balls 21 stored therein. The urine 29 contacts the heat holding balls 21 located at the upper portion of the inner container, whereby the heat from the heat holding balls 21 is absorbed by the urine 29 for allowing the temperature of the heat holding balls 21 to decrease. Hence, the temperature inside the inner container 14 is also decreased. Such change of temperature is detected by the temperature sensor 81 which issues a signal which is supplied to the control circuit 84 and the switching circuit 87 to stop the blowing operation of the air pump 24 to thereby prevent the urine 29 from being jetted from the discharge port 22a until the temperature of the inner container 14 again rises to an unsatisfactory level.

At the same time, inasmuch as the air from the outside is introduced by the air pump 24 into the liquid supply pipe 22, the introduced air is discharged through the discharge port 13 toward the deodorizing housing 36. The saturated vapor in the upper portion of the sealed liquid container 11 is fed into the heat pipe 41 together with the air discharged from the pipe 22 so that the saturated vapor is not retained inside the container 11 so as to maintain the container 11 at a humidity less than that of saturated vapor. Hence, the air supplied from the air pump 24 functions to accelerate the discharge of the saturated vapor evaporated from the inner container 14.

The air pump 24 is actuated on the basis of the signal issued by the temperature detector 81 when the temperature of the inner container 14 is detected by the temperature detector 81 so that the urine 29 in the liquid container 11 is circulated and evaporated in the inner container 14 by the heating function of the heater 18 and the heat holding balls 21, whereby the liquid level W of the urine 29 is gradually lowered. The liquid level W is lowered with the progress of the evaporation operation by the heater 18 until it reaches the position of the lower liquid level detector 83. When reaching the position of the lower liquid level detector 83, the liquid level W is detected and the lower liquid level detector 83 issues a signal which is supplied to the control circuit 84, whereby all of the switching circuits 85 through 88 are closed to stop the evaporation operation and await the next evaporation operation.

Thus, the liquid (i.e. water) of the urine 29 is successively evaporated and is delivered to the deodorizing housing 36 through the discharge port 13. However, since the saturated vapor in the discharge port 13 has components such as ammonia, bromine, and the like which create a bad smell, the saturated vapor can not be discharged outside to the environment in this condition. Hence, the saturated vapor may be subjected to a deodorizing process.

The saturated vapor discharged from the discharge port 13, as it passes through the pipe 41, contacts and is heated by the secondary heater 42 which is already energized and reaches a high temperature. The saturated vapor, which is heated to a high temperature by the secondary heater 42, then flows upwardly and contacts the catalyst 43 which oxidizes the saturated vapor so that the components causing the bad smell are removed from the saturated vapor. Furthermore, as the blower means 37 is already actuated to draw air into the housing 36, the air passes through the catalyst 43 and is drawn and discharged through the diffusing pipe 35 to the outside. In such manner, the bad smell is removed from the saturated vapor which is then discharged outside as mere vapor.

With the urine treating device provided with this control system therein, a series of successive operations can be automatically effected to thereby always keep the evaporation temperature of the liquid constant so that an efficient evaporation can be achieved and the time to evaporate a predetermined amount of liquid is remarkably shortened.

Assembly of Liquid Evaporator (FIGS. 21 TO 24)

The liquid evaporator may be assembled in the manner illustrated in FIGS. 21 through 24.

First, as shown in FIG. 21, an outer container 11 is inserted through the open upper end of an outer casing 76. A bottom surface of the outer container 11 is supported on legs 77 fixedly mounted on the bottom of the outer casing 76.

Next, as shown in FIG. 22, an inner container 14 is inserted through the open upper end of the outer container 11. The bottom surface of the inner container 14 is placed on and engaged with a pedestal 78 (such as a shouldered ring) mounted on legs 15 fixed to the bottom of container 11 so that the inner container 14 can be prevented from sliding relative to the outer container 11.

Then, as shown in FIG. 23, a cover 79 having the heater 18 and the liquid supply pipe 71 suspended therefrom is inserted slowly into the open end of the outer container 11 from the upper portion thereof. Inasmuch as the cover 79 is provided with the heater 18 and the liquid supply pipe 71, the heater 18 and the liquid supply pipe 71 are inserted into and properly positioned within the outer container 11. Thereafter, the upper open peripheral edge of the outer container 11 is allowed to sealingly contact with and be fastened, by means of bolts and the like, to the lower surface of the cover 79 whereby the outer casing 76, the outer container 11, and the cover 79 are integrally assembled.

Figure 24:
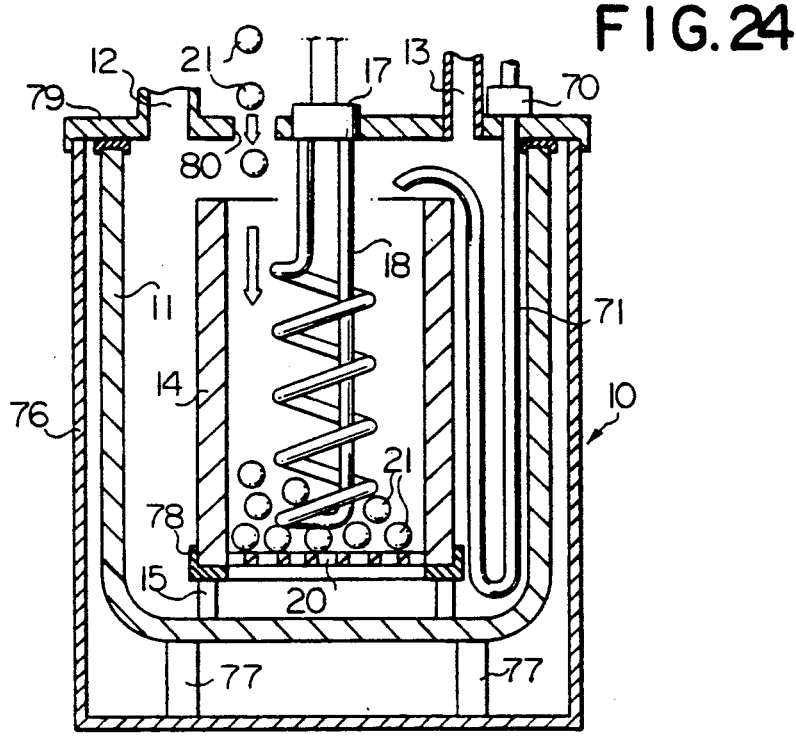

Finally, as shown in FIG. 24, a plurality of heat holding balls 21 are inserted through an insertion hole 80 defined in the cover 79 until they are successively accumulated in the inner container 14. After the heat holding balls 21 are accumulated in the inner container 14 according to a predetermined number thereof, the insertion hole 80 is closed by a cap (not shown) so that the inside of the liquid container 11 is air-tightly closed and shut off from the outside.

Figure 25:
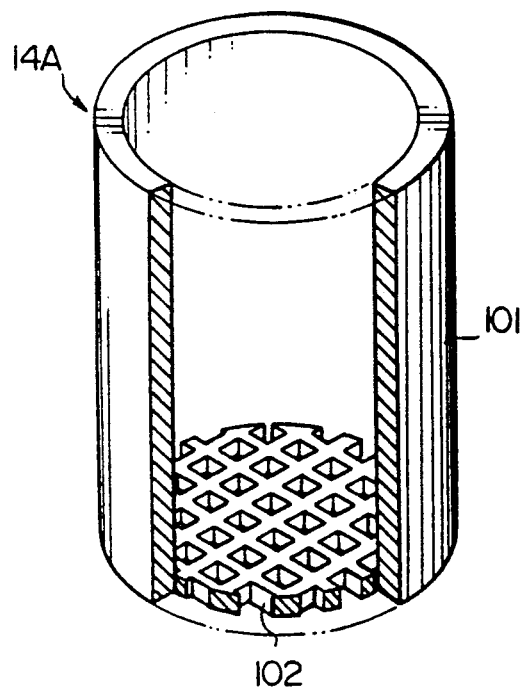
FIG. 25 is a partially cut off perspective view of a modified constituent employed in the liquid evaporator.
Figure 26:
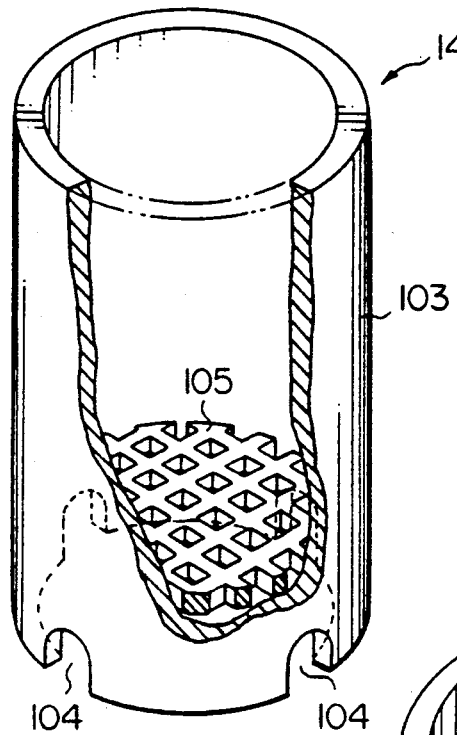
FIG. 26 is a partially cut off perspective view of a further modified constituent employed in the liquid evaporator.
Figure 27:
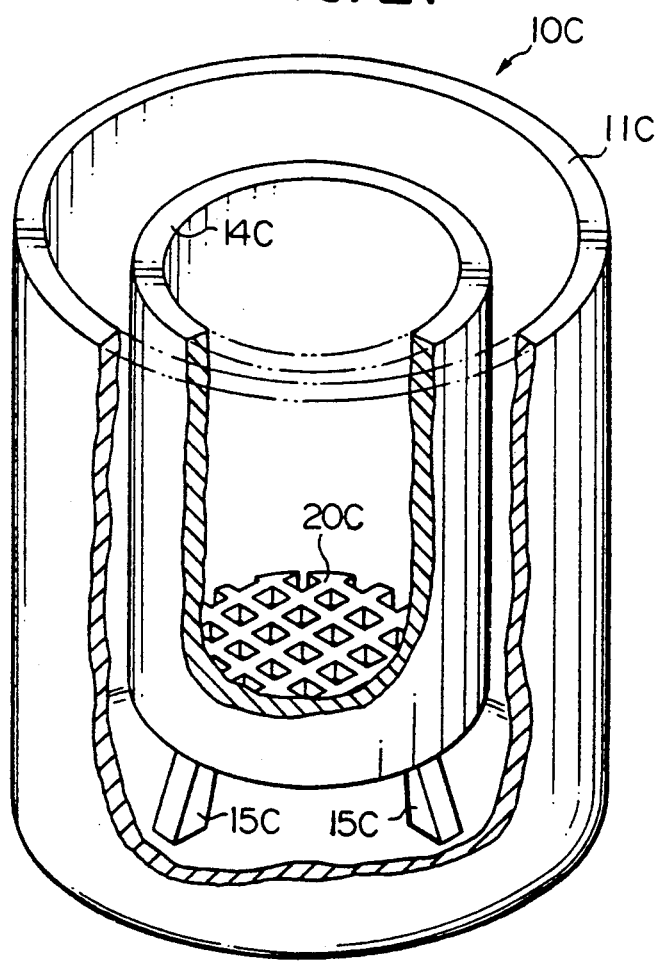
FIG. 27 is a partially cut off perspective view of a still further modified constituent employed in the liquid evaporator.
Figure 28:
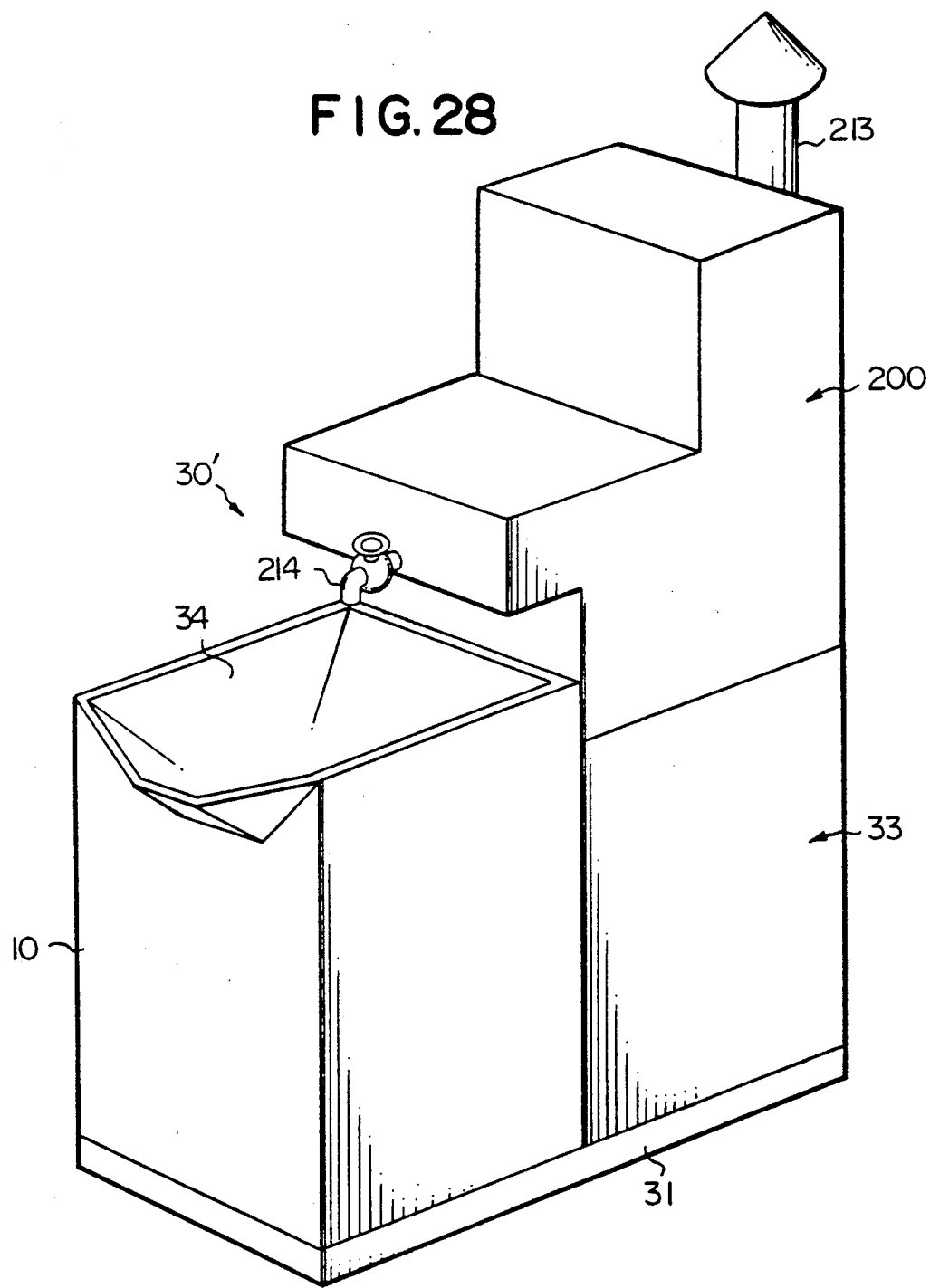
FIG. 28 is a perspective view of a fourth embodiment of a urine treating device provided with a cooling system.
Figure 29:
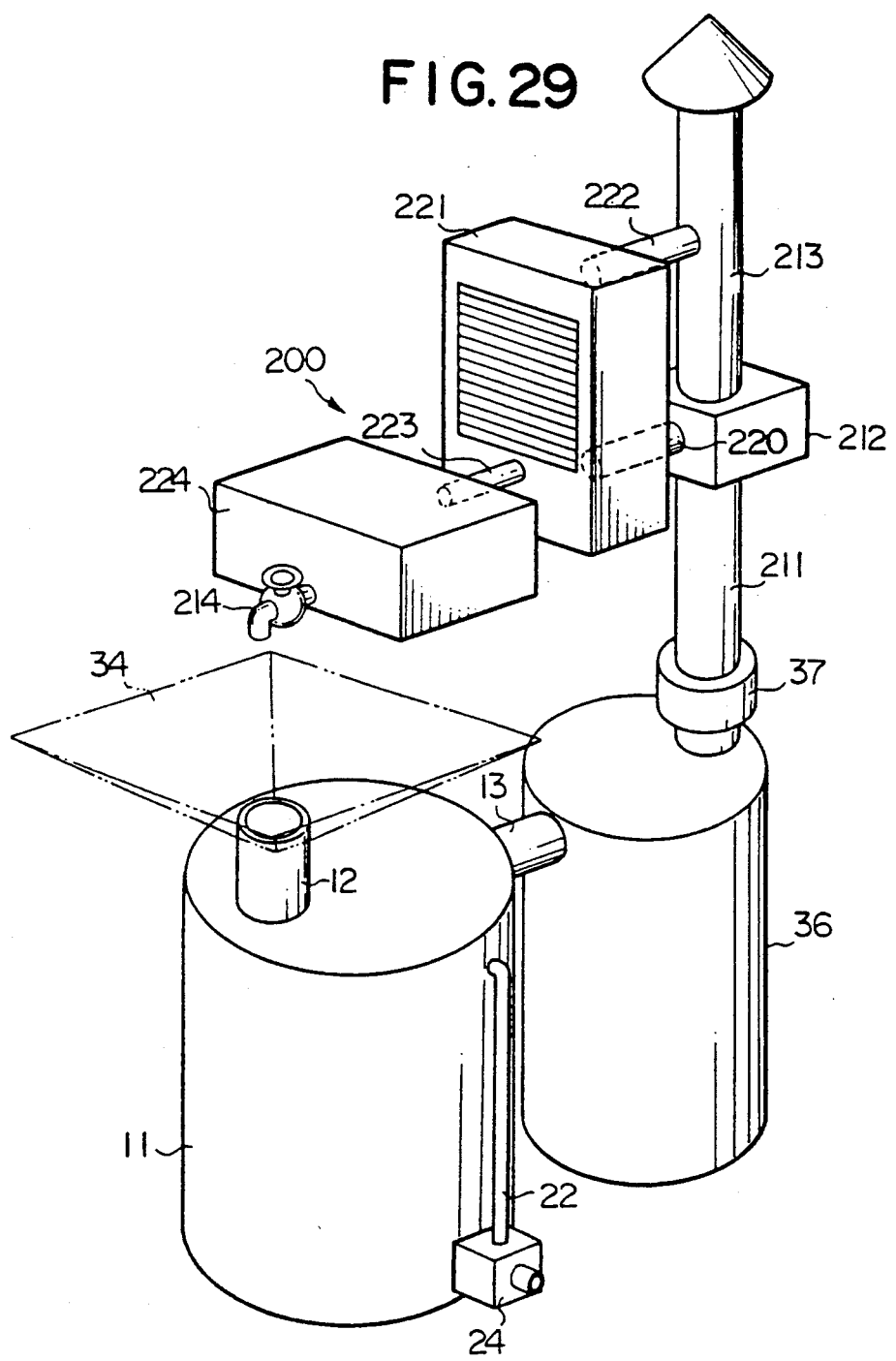
FIG. 29 is a perspective view for explaining the positional relationship between the liquid evaporator, the deodorant device, and the cooling system.
Figure 30:
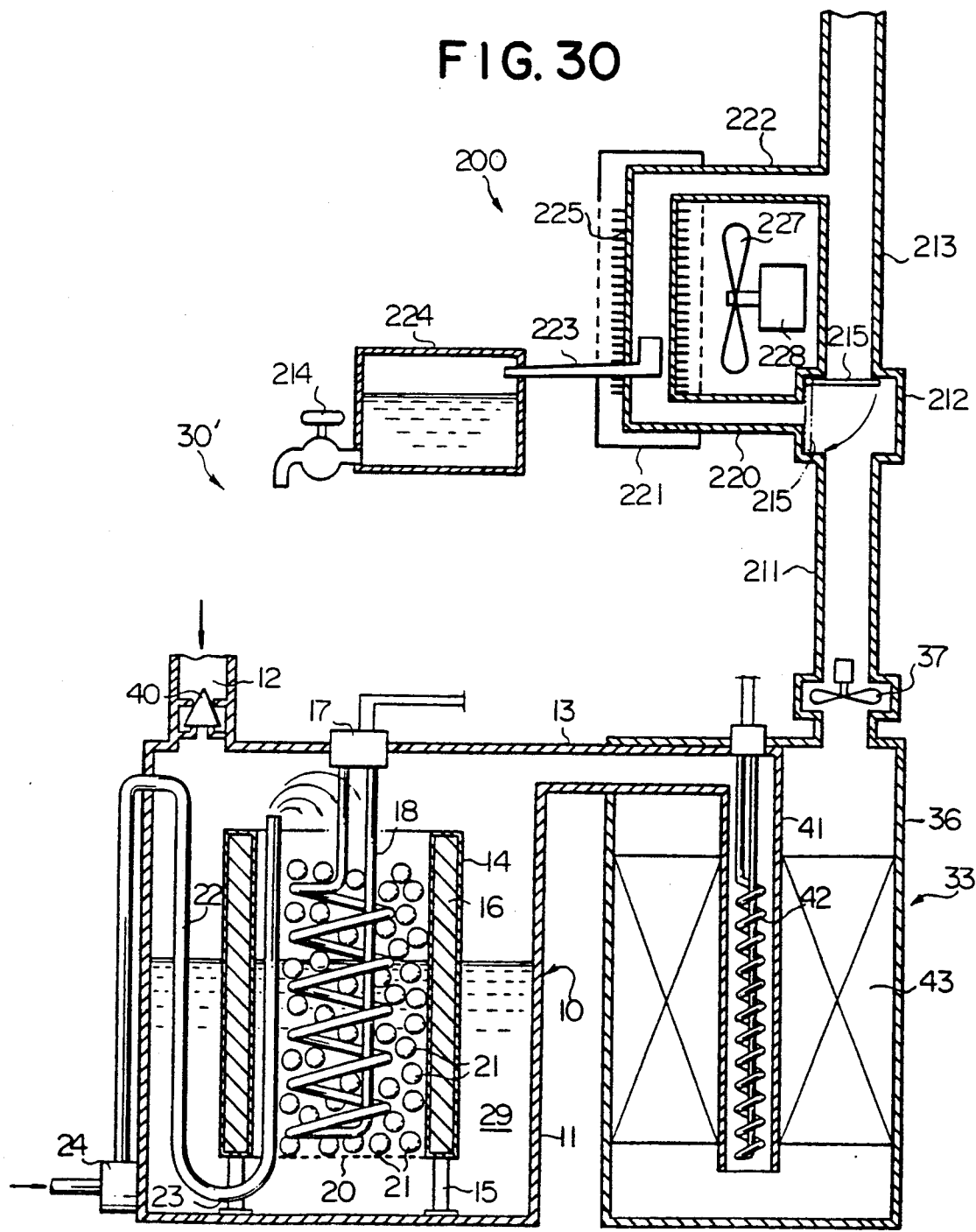
FIG. 30 is a cross sectional view of the urine treating device of FIG. 29.

Modifications of Inner Container (FIGS. 25-27)

As illustrated in FIG. 25, a first modified inner container 14A comprises a cylindrical peripheral wall 101 and a drainboard 102 having an intersected net shape connected to the open bottom end of the peripheral wall 101. The wall 101 and drainboard 102 are made of clay and formed integrally by subjecting them to a sintering process in a kiln and an extraction mold. Inasmuch as the inner container 14A is thus integrally formed, the integral cylindrical peripheral wall 101 and the drainboard 102 can be easily broken, as by a hammer, when it is to be disposed of.

A second modified inner container 14B illustrated in FIG. 26 comprises a cylindrical peripheral wall 103 having a plurality of U-shaped communicating slots 104 at the lower peripheral end thereof and a net shaped drainboard 105 fixedly mounted on the cylindrical wall at a position just above the lower peripheral end of the cylindrical wall 103. The cylindrical peripheral wall 103 and the drainboard 105 are respectively made of clay and formed integrally by subjecting them to a sintering process and an extraction mold. Inasmuch as the communicating slots 104 are formed at the lower peripheral end of the inner container 14B below the drainboard 105, the lower end of container 14B can be placed directly on the bottom surface of the outer container 11 without using the separate legs 15.

A third modified inner container according to the present invention will be described with reference to FIG. 27. According to this embodiment, an integral liquid evaporator 10A comprises an outer liquid container 11C having the same outer shape as that of container 11 (FIGS. 21-24) and a plurality of support legs 15C are fixedly mounted on the inner bottom surface of the liquid container 11C, and a cylindrical inner container 14C is connected to the legs 15C and has at the lower portion thereof a net shaped drainboard 20C. The liquid evaporator 10C is as a whole integrally formed by creating an extraction mold made of ceramic granules mixed with water, drying it in the shade, and subjecting it to sintering in a kiln.

When the integral liquid evaporator 10C is used a plurality of times, impurities, dirty material, and sludge adheres to the inner periphery of the liquid container 11C and to the inner and outer peripheries of the inner container 14C. When the integral liquid evaporator 10C with adhering solid material is extracted from the outer casing 76 (FIG. 21), the liquid container 11C and the inner container 14C are respectively broken by a hammer or the like so that the integral liquid evaporator is as a whole broken into pieces and discarded.

With such arrangements as illustrated in FIGS. 21 through 27, only liquid such as household dirty waste, urine, and industrial dirty waste can be evaporated with ease. In the course of treating and evaporating the liquid, the liquid in the inner container is first evaporated so that the liquid can be evaporated with high efficiency within a short period of time. After a plurality of usages of the liquid evaporator, inasmuch as the inner container and the liquid container are respectively formed by porcelain, it can be discarded with ease or cleaned with ease. Furthermore, cleaning of the liquid evaporator, which is disliked by an operator, is simplified so that it reduces the labor of the operator.

Modified Device of FIGS. 28 to 31

A fourth embodiment of the urine treating device, as provided with a liquid recovery means, will now be described with reference to FIGS. 28-31.

The urine treating device 30' includes a liquid evaporator 10, a deodorizing device 33 and a liquid recovery means 200. The constitution of the liquid evaporator 10 and deodorizing device 33 are the same as those illustrated in FIG. 10.

The liquid recovery means 200 includes a cylindrical joint pipe 211 which is connected to the blower means 37 of the deodorizing device 33, a passage shifting means 212 connected to the upper end of the joint pipe 211 for shifting the flow passage of the liquid, a diffusion pipe 213 connected to the upper portion of the passage shifting means 212, a branching pipe 220 extending perpendicularly to the passage shifting means 219, a cooling device 221 connected to the branching pipe 220, a discharge pipe 222 provided over the upper side of the cooling device 221 and connected to the side surface of the diffusion pipe 213 for discharging the air after recovering the liquid from the vapor, a liquid discharge pipe 223 provided at the front lower portion of the cooling device 221 and protruding therefrom for discharging the liquid obtained by cooling the saturated vapor, a liquid-receiving tank 224 connected to the pipe 223 for storing the liquid flowing out from the pipe 223, and a cock 214 provided at the front lower portion of the tank 224.

The passage shifting means 212 (FIG. 30) includes a valve 215 which is swingable about 90. The branching pipe 220 connects to a cooling pipe 225 housed in the cooling device 221. The cooling pipe 225 has a plurality of fins fixed to the periphery thereof and at the inside lower portion thereof the pipe 223 has an open end which is directed upwardly for recovering the condensed liquid. The lower other end of the pipe 223 is connected to the upper portion of the tank 224. Connected to the upper portion of the cooling pipe 225 is the discharge pipe 222 which is connected to the side surface of the diffusion pipe 213. Provided at the side of the cooling device 221 is a cooling fan 227 driven by a motor 228.

The operation of the urine treating device of FIGS. 28-31 will be described. Inasmuch as the operations of the liquid evaporator 10 and the deodorizing device 33 are the same as those illustrated in FIG. 10 as described above, the descriptions of these operations are omitted.

The air discharged out from the deodorizing device 33 is delivered toward the diffusion pipe 213 via the connecting pipe 211. At this time, the valve 215 of the passage shifting means 212 is positioned as shown by solid lines in FIG. 30 so that the vapor flows into the branching pipe 220. The heated saturated vapor introduced into the cooling pipe 225 is cooled within the cooling pipe 225, which is always cooled by the air from the fan 227, and the liquid of the saturated vapor forms as liquid drops which are collected by the pipe 223 and discharged into the tank 224 in which the liquid is stored for use, such as for washing hands. The vapor cooled by the cooling pipe 225 then flows through the discharging pipe 222 back into the diffusion pipe 213 and is discharged from the upper portion of the diffusion pipe 213 to the outside environment.

People can then utilize the distilled liquid or water stored in the tank 224 by opening the cock 214. The distilled water can be used to wash hands, etc. The distilled water thus used falls into receiver 34 and passes through trap 40 and back into the liquid container 11.

Inasmuch as the liquid tank 224 has a predetermined volume, the successive recovery of liquid by cooling the vapor can overflow the tank 224. Hence, if the distilled water in tank 224 reaches a predetermined volume, the valve 215 is shifted to the position as shown in dotted line in FIG. 30 so that the saturated vapor flowing in the pipe 211 is directly discharged into the diffusion pipe 213. The vapor, the liquid of which is not collected, is then discharged to the atmosphere and diffused outside.

With this arrangement of the urine treating device, it is possible to install a portable temporary water closet at a place where no sewer system is provided, and to effect operation of the urine treating at such place. As a result, neither a vacuum system nor a disinfectant process is required, nor is maintenance required, and the temporary water closet can be installed or removed with ease. Furthermore, inasmuch as it is possible to recover water from the evaporated vapor and to reutilize the recovered water for washing hands, the device is very hygienic.

Although the invention has been described in its preferred form with a certain degree of particularity, it is to be understood that many variations and changes are possible in the invention without departing from the scope thereof.

What is claimed is:

1. A liquid evaporator comprising:
   an air-tight outer container defining therein an interior space for containing liquid therein;
   an inner container mounted on said outer container for partitioning the interior space of said outer container into an inner space and an outer space respectively inside and outside of said inner container, said inner container having a thermal insulating wall;
   a heater fixed to the outer container and positioned inside the inner container; and
   a plurality of heat holding balls contained in the inner container.

2. A liquid evaporator comprising:
   an air-tight outer container defining therein a space for containing liquid therein;
   supports stationarily positioned on said outer container;
   an inner container mounted on the supports for partitioning the space within the outer container, said inner container having a wall made of thermal insulating material;
   a heater fixed to an upper portion of the outer container and mounted inside the inner container;
   a plurality of heat absorbing balls contained in the inner container;
   a liquid supply mechanism for sucking liquid contained in the outer container and discharging the liquid over the inner container; and
   a temperature detector provided inside the inner container for detecting the rise of the temperature of the inner container to actuate the liquid supply mechanism for causing the liquid to be discharged over the inner container.

3. A liquid evaporator comprising:
an air-tight outer container defining a space for containing liquid therein;
supports stationarily positioned on said outer container;
an inner container mounted on the supports for partitioning the space of the outer container, said inner container having a wall made of thermal insulating material;
a heater fixed to an upper portion of the outer container and mounted inside the inner container;
a plurality of heat holding balls contained in the inner container;
a liquid supply mechanism for sucking liquid contained in the outer container and discharging the liquid over the inner container;
an upper liquid level detector provided in the upper portion of the outer container for detecting that the liquid in the outer container reaches an upper level to actuate the heater to evaporate the liquid; and
a lower liquid level detector provided in the lower portion of the outer container for detecting that the liquid in the outer container reaches a lower level to stop the actuation of the heater.

4. The evaporator according to claim 3, including a temperature detector provided inside the inner container for detecting the rise of the temperature of the inner container to actuate the liquid supply mechanism for causing the liquid to be discharged over the inner container.

5. A liquid evaporator, comprising:
an outer container defining therein a closed compartment for receiving waste liquid for evaporation, said outer container including a generally tubular sidewall which extends vertically and joins to vertically spaced top and bottom walls;
an inner container positioned substantially vertically concentrically within said outer container, said inner container comprising a generally vertically elongate hollow tube which is opened at the upper end thereof, said inner container having a cross section which is substantially smaller than the cross section of the tubular sidewall of said outer container so that said inner container partitions said compartment into an inner space as defined within said inner container and an outer space which is of an annular configuration and is defined between said inner and outer containers;
means providing for liquid communication between said inner and outer spaces in the vicinity of said bottom wall so that the liquid will be at the same level within both of said inner and outer spaces, the liquid level within said compartment being below the upper end of said inner container;
said upper end of said inner container being spaced downwardly from said top wall to define a vapor-collecting region in an upper portion of said outer container;
an inlet communicating with the upper portion of said compartment for permitting waste to be supplied thereto;
an outlet communicating with the upper portion of said compartment for permitting discharge of the vapor therefrom;

heater means positioned substantially entirely within the inner space for heating the liquid therein to effect vaporization of the liquid within the inner space so that the vapors pass outwardly through the open upper end of said inner container into the upper portion of the outer container for discharge through the outlet; and
said inner container having thermal insulating properties for confining the heat substantially within the inner space and for preventing the heat from being transferred outwardly into the liquid in the outer space.

6. The liquid evaporator according to claim 5, wherein the inner space is substantially filled with a plurality of heat-absorbing balls, said balls being confined solely within said inner container.

7. The liquid evaporator according to claim 6, including a liquid supply means for withdrawing liquid from adjacent the bottom of said compartment at a location outside the inner space and discharging the liquid into the open upper end of said inner container so that the discharged liquid contacts the heater and the heat-absorbing balls.

8. The liquid evaporator according to claim 7, wherein said inner container has a perforated support plate extending transversely thereacross adjacent the lower end thereof for confining the heat-absorbing balls within said inner space, and support legs cooperating between said inner and outer containers for maintaining the inner container concentrically stationarily positioned within the outer container so that the support plate is spaced upwardly a small distance from the bottom wall of the outer container to allow free and open flow of liquid between the inner and outer spaces.

9. A liquid evaporator, comprising:
an air-tight outer container defining therein a chamber for containing liquid therein;
a heating device supported on said outer container for heating liquid in said outer container; and
heat concentration means cooperable with said heating device for effecting a concentration of liquid heating in only a localized volume of liquid in said outer container by resisting heat flow from said localized volume of liquid to the remaining liquid in said outer container, said heat concentration means including an upright hollow tubular member provided in the chamber defined by the outer container, said tubular member having a tubular thermal insulating wall which is spaced inwardly from said outer container, said tubular member having openings adjacent opposite ends thereof which respectively permit open flow liquid communication and open flow vapor communication between an interior space defined inside said tubular member and an exterior space defined between said thermal insulating wall and said outer container, and said heating device being positioned centrally within said tubular thermal insulating wall.

10. The liquid evaporator according to claim 9, further including an inlet port for supplying dirty liquid waste into said outer container and a discharge port for discharging from said outer container saturated vapor generated therein, said inlet and discharge ports being mounted in an upper portion of the outer container.

11. In a liquid evaporator, comprising an airtight, upright, outer container defining an internal chamber for receiving liquid, inlet conduit means close to the top of said outer container for feeding liquid into said outer container and outlet conduit means close to the top of said outer container for discharging vapor from said outer container, the improvement which comprises;

a heating device supported on said outer container for heating liquid in said outer container, and heat concentration means cooperable with said heating device for effecting a concentration of liquid heating in only a localized volume of liquid in said outer container by resisting heat flow from said localized volume of liquid to the remaining liquid in said outer container, said heat concentration means including an upright, hollow, inner container disposed inside of and spaced inwardly from said outer container so as to divide said internal chamber into an outer portion between said inner and outer containers and an internal portion inside said inner container, said inner container being open at its upper and lower ends so that liquid can flow from the bottom end of said outer portion of said internal chamber into the bottom end of said internal portion and vapor can flow form the upper end of said internal portion into the upper end of said outer portion of said internal chamber, said inner container having a thermal insulating sidewall for reducing heat transfer from said internal portion to said outer portion of said internal chamber, and said heating device being centrally disposed in the internal portion of said chamber for heating and evaporating liquid in said internal portion.

12. The liquid evaporator according to claim 11, wherein said inner container is made of porcelain.

13. The liquid evaporator according to claim 11, including liquid supply means for drawing liquid from said outer portion of said internal chamber and discharging the liquid into said open upper end of said inner container.

14. The liquid evaporator according to claim 13, wherein the liquid supply means includes a submergible pump provided inside the outer container and having a suction side in communication with the liquid in the internal chamber and a discharge side connected to a liquid supply pipe.

15. The liquid evaporator according to claim 13, wherein the liquid supply means comprises an air pump and supply pipe means connected to the pump for supplying air therethrough, and for sucking liquid from the outer portion of said internal chamber and discharging the liquid together with the air into the upper end of the inner container.

16. The liquid evaporator according to claim 15, wherein the supply pipe means includes a liquid supply, pipe disposed inside the inner container and having a suction opening at the lower end thereof and a discharge opening at the upper end thereof, and an air supply pipe connected to the liquid supply pipe adjacent the lower end thereof.

17. The liquid evaporator according to claim 15, wherein the air pump is positioned outside the outer container, and wherein the supply pipe means is connected at one end thereof to the air pump and extends upwardly outside the outer container and is then turned inwardly into the internal chamber and then downwardly into the liquid to a point adjacent the bottom of the outer container and is then turned upwardly and terminates at a discharge port disposed over the open end of the inner container, the supply pipe means being provided with a suction port adjacent the bottom of the internal chamber.

18. The liquid evaporator according to claim 15, wherein the air pump is positioned outside the outer container, and wherein the pipe means includes an air supply pipe connected to the air pump and extending into the outer container for connection to a liquid supply pipe having an open end positioned within the liquid of the outer container.

19. The liquid evaporator according to claim 15, wherein the air pump is positioned at the upper portion of the outer container, and wherein the supply pipe means is provided within the outer container and connects to the air pump and extends downward from the upper portion of the outer container and is then turned upwardly at a position adjacent to the bottom of the outer container, said supply pipe means being provided with a suction port adjacent the bottom of the outer container.

20. The liquid evaporator according to claim 11, including a plurality of support legs mounted on said outer container and disposed within said internal chamber and said inner container being mounted on said support legs.

21. The liquid evaporator according to claim 20, wherein said inner container includes means defining communication slots therein at said lower end thereof, said inner container including wall portions disposed between adjacent said slots, and said support legs being extensions of said wall portions.

22. The liquid evaporator according to claim 11, wherein the inner container has at the bottom portion thereof a drainboard capable of communicating with the liquid, the inner container and the drainboard both being made of porcelain and integrated together.

23. The liquid evaporator according to claim 11, wherein the outer container and the inner container are both made of porcelain and integrated together.

* * * * *

UNITED STATES PATENT AND TRADEMARK OFFICE
CERTIFICATE OF CORRECTION

PATENT NO. : 5 149 399

DATED : September 22, 1992

INVENTOR(S) : Mitsuhiro KISHI et al

It is certified that error appears in the above-identified patent and that said Letters Patent is hereby corrected as shown below:

Column 17, line 34; change "A" to ---The---.

Column 19, line 21; change "form" to ---from---.

Column 19, line 52; delete ",".

Column 20, lines 36 and 37; after "chamber" insert ---,---.

Signed and Sealed this

Eleventh Day of October, 1994

Attest:

BRUCE LEHMAN

*Attesting Officer*     *Commissioner of Patents and Trademarks*